United States Patent
Modlin et al.

(10) Patent No.: US 8,549,059 B2
(45) Date of Patent: Oct. 1, 2013

(54) IN-PLACE FAST FOURIER TRANSFORM PROCESSOR

(75) Inventors: Cory Modlin, Chateauneuf de Grasse (FR); Tali Erde, Tel-Aviv (IL); Berko Idan, Tel-Aviv (IL)

(73) Assignee: Texas Instruments Incorporated, Dallas, TX (US)

( * ) Notice: Subject to any disclaimer, the term of this patent is extended or adjusted under 35 U.S.C. 154(b) by 1157 days.

(21) Appl. No.: 12/476,232

(22) Filed: Jun. 1, 2009

(65) Prior Publication Data

US 2010/0174769 A1 Jul. 8, 2010

Related U.S. Application Data

(60) Provisional application No. 61/143,335, filed on Jan. 8, 2009, provisional application No. 61/143,331, filed on Jan. 8, 2009, provisional application No. 61/143,330, filed on Jan. 8, 2009, provisional application No. 61/143,328, filed on Jan. 8, 2009.

(51) Int. Cl.
*G06F 17/14* (2006.01)

(52) U.S. Cl.
USPC .......................... 708/404; 370/210

(58) Field of Classification Search
USPC ............ 707/404; 708/404; 370/210
See application file for complete search history.

(56) References Cited

U.S. PATENT DOCUMENTS

| | | | |
|---|---|---|---|
| 5,091,875 A | 2/1992 | Wong et al. | |
| 5,093,801 A * | 3/1992 | White et al. | 708/404 |
| 5,835,392 A | 11/1998 | Dulong et al. | |
| 6,035,313 A | 3/2000 | Marchant | |
| 6,304,887 B1 * | 10/2001 | Ju et al. | 708/404 |
| 6,401,162 B1 | 6/2002 | Nasserbakht | |
| 6,434,583 B1 | 8/2002 | Dapper et al. | |
| 6,718,356 B1 | 4/2004 | Rosner et al. | |

(Continued)

OTHER PUBLICATIONS

Jo et al., IEEE Transactions on Circuits and Systems-I: Regular Papers, vol. 52, No. 5, May 2005, pp. 911-919.*

(Continued)

*Primary Examiner* — Cheyne Ly
(74) *Attorney, Agent, or Firm* — Steven A. Shaw; W. James Brady; Frederick J. Telecky, Jr.

(57) ABSTRACT

An N-point Fast Fourier Transform (FFT) using mixed radix stages with in-place data sample storage may be performed by decomposing N into a product of R sequential mixed radix stages of radix-r(i). N data samples are partitioned into at least B memory banks, where B is equal to a largest radix of the R radix stages. Each input data sample to each radix-r(i) butterfly comes from r(i) different memory banks and the output data samples are written to the same memory locations in the r(i) memory banks. Determining from which memory bank the input data samples and output data samples of the butterflies are stored is done based on the radix size and sequential position of the radix stage. Determining the address of the input data samples and the output data samples within each memory bank is based on the radix size and sequential position of the radix stage.

21 Claims, 13 Drawing Sheets

(56) References Cited

U.S. PATENT DOCUMENTS

| | | |
|---|---|---|
| 6,728,742 B1 | 4/2004 | Hertz |
| 7,007,056 B2 | 2/2006 | Ryu |
| 7,164,723 B2 | 1/2007 | Sunwoo |
| 7,395,293 B1 | 7/2008 | Szedo et al. |
| 7,464,127 B2 | 12/2008 | Kang |
| 7,496,618 B2 | 2/2009 | Brown |
| 2007/0192394 A1* | 8/2007 | Wang et al. ............ 708/404 |
| 2008/0126026 A1* | 5/2008 | Lee et al. ............ 703/2 |
| 2010/0017452 A1* | 1/2010 | Lee et al. ............ 708/404 |

OTHER PUBLICATIONS

Yeh et al., IEEE Transactions on Signal Processing, vol. 51, No. 3, Mar. 2003, pp. 864-874.*

Baek et al, IEEE, 2003, pp. II-133 to II-136.*

L.G. Johnson, "Conflict Free Memory Addressing for Dedicated FFT Hardware", IEEE Transactions on Circuits and Systems-II: Analog and Digital Signal Processing, vol. 39, No. 5, pp. 312-316, May 1992.

\* cited by examiner

IN-PLACE FAST FOURIER TRANSFORM PROCESSOR

CLAIM OF PRIORITY UNDER 35 U.S.C. 119(e)

The present application claims priority to and incorporates by reference U.S. Provisional Application No. 61/143,335, filed Jan. 8, 2009, entitled "FFT Coprocessor." The present application also claims priority to and incorporates by reference U.S. Provisional Application No. 61/143,331, filed Jan. 8, 2009, entitled "FFT Coprocessor Functional Specification." The present application also claims priority to and incorporates by reference U.S. Provisional Application No. 61/143,330, filed Jan. 8, 2009, entitled "FFT VBUS Sub Specification." The present application also claims priority to and incorporates by reference U.S. Provisional Application No. 61/143,328, filed Jan. 8, 2009, entitled "FFT Coprocessor Streaming and Scheduler I/F."

FIELD OF THE INVENTION

This invention generally relates to digital signal processing, and in particular to Fast Fourier Transform calculation in orthogonal frequency division multiple access (OFDMA), DFT-spread OFDMA, and single carrier frequency division multiple access (SC-FDMA) systems.

BACKGROUND OF THE INVENTION

The Fast Fourier Transform (FFT) is the generic name for a class of computationally efficient algorithms that implement the Discrete Fourier Transform (DFT) and are widely used in the field of digital signal processing. With the advent of digital signal processors (DSP), near real time digital signal processing has become possible. However, circuit designers are still striving for faster and better FFT devices. In a typical computing system, the most time consuming operation is usually associated with memory. This is evident in the many schemes which have been developed to boost memory access time to increase the overall speed of computing systems.

The FFT algorithm is especially memory access and storage intensive. For example, in order to compute a radix-4 decimation-in-frequency (DIF) FFT butterfly, four data samples and three twiddle coefficients are read from memory and four resultant data samples are written back into memory. In an N-point radix-4 DIF FFT, there are a total of $2N \log_4 N$ pieces of data and intermediate data to be accessed and stored and a total of $(3N/4)\log_4 N$ twiddle coefficients to be accessed. In other words, to compute a 64-point radix-4 DIF FFT, 192 data memory reads and 192 data memory writes and 144 memory reads for the twiddle coefficients must be performed. Accordingly, it is desirable to provide adequate memory arrangement to accommodate all the data and coefficients.

In computing the FFT butterflies going from one stage to the next, the output data of the butterfly computations of the former become the input data of the latter, where the order and grouping of the data vary from one stage to the next. It is therefore necessary to ensure that correct data is accessed from memory for each butterfly computation.

To further increase speed, a fully parallel implementation of an FFT circuit may be desirable. In such a parallel FFT circuit, it is preferable that the four pieces of data and the three twiddle coefficients are available substantially simultaneously for each butterfly computation.

It is apparent from the foregoing that memory access for an FFT circuit is not trivial. Not only a large number of data are accessed from memory, but a large number of resultant data are also stored back into memory for use in future computations. For each butterfly computation, the data and twiddle coefficient must also be obtained substantially simultaneously. Furthermore, for each memory access and storage operation, the address must be correctly computed and referenced.

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable.

In contrast to NodeB, the mobile UE can comprise portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

In the Universal Mobile Telecommunications System (UMTS/HSxPA) specifications, systems are capable of supporting high speed packet access for both downlink (up to 14 Mbps) and uplink (up to 5.76 Mbps). Although HSxPA systems offer substantial improvement for packet data transmission over earlier UMTS systems, their designs were limited by compatibility requirements with previous generations of UMTS specifications. With the emergence of OFDM-based mobile broadband systems such as WiMAX 802.16e, a comprehensive long term evolution (LTE) of UMTS was required to remain competitive in the long term. As a result, work was begun on LTE Evolved UMTS Terrestrial Radio Access (E-UTRA). Long term goals for the system include support for high peak data rates (100 Mbps downlink and 50 Mbps uplink), low latency (10 ms round-trip delay), improved system capacity and coverage, reduced operating costs, multi-antenna support, efficient support for packet data transmission, flexible bandwidth operations (up to 20 MHz) and seamless integration with existing systems.

Control information bits are transmitted from each mobile to the NodeB in the uplink (UL), for example, for several purposes. The control information is typically required to be highly reliable in order to support an appropriate and accurate operation. This uplink control information is typically transmitted using the physical uplink control channel (PUCCH), as defined by the 3GPP working groups (WG), for evolved universal terrestrial radio access (EUTRA). The EUTRA is sometimes also referred to as 3GPP long-term evolution (3GPP LTE). The structure of the PUCCH is designed to provide sufficiently high transmission reliability. In addition to PUCCH, the EUTRA standard also defines a physical uplink shared channel (PUSCH), intended for transmission of uplink user data. The general operations of the physical channels are described in the EUTRA specifications, for example: "3rd Generation Partnership Project; Technical Specification Group Radio Access Network; Evolved Universal Terrestrial Radio Access (E-UTRA); Physical Channels and Modulation" (3GPP TS 36.211, Release 8). Modulation and demodulation of the control data and user data passed between the base station and mobile UE is performed using DFT and inverse DFT calculations.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

A base station in an LTE network is required to support a large number of frequency channels and multiple types of data encoding schemes. As a result, fast processing of DFTs and inverse DFTs (IDFT) of several different sizes is required, such as: 12, 24, 36, 48, 60, 72, 96, 108, 120, 144, 180, 192, 216, 240, 288, 300, 324, 360, 384, 432, 480, 540, 576, 600, 648, 720, 768, 864, 900, 960, 972, 1080, 1152, 1200, 1296. A fast Fourier transform (FFT) is an efficient algorithm to compute the discrete Fourier transform (DFT) and its inverse. As will be described in more detail below, calculating an N-point Fast Fourier Transform can be done in an efficient manner using mixed radix stages with in-place data sample storage by decomposing the N-point DFT into a product of R sequential mixed radix stages of radix-r(i), where i represents the stage number, such that $$N = r(0) * r(1) * r(2) * r(3) * \ldots * r(R-1)$$

wherein the sequential order of the stages determines the order in which they are calculated.

Figure 1:
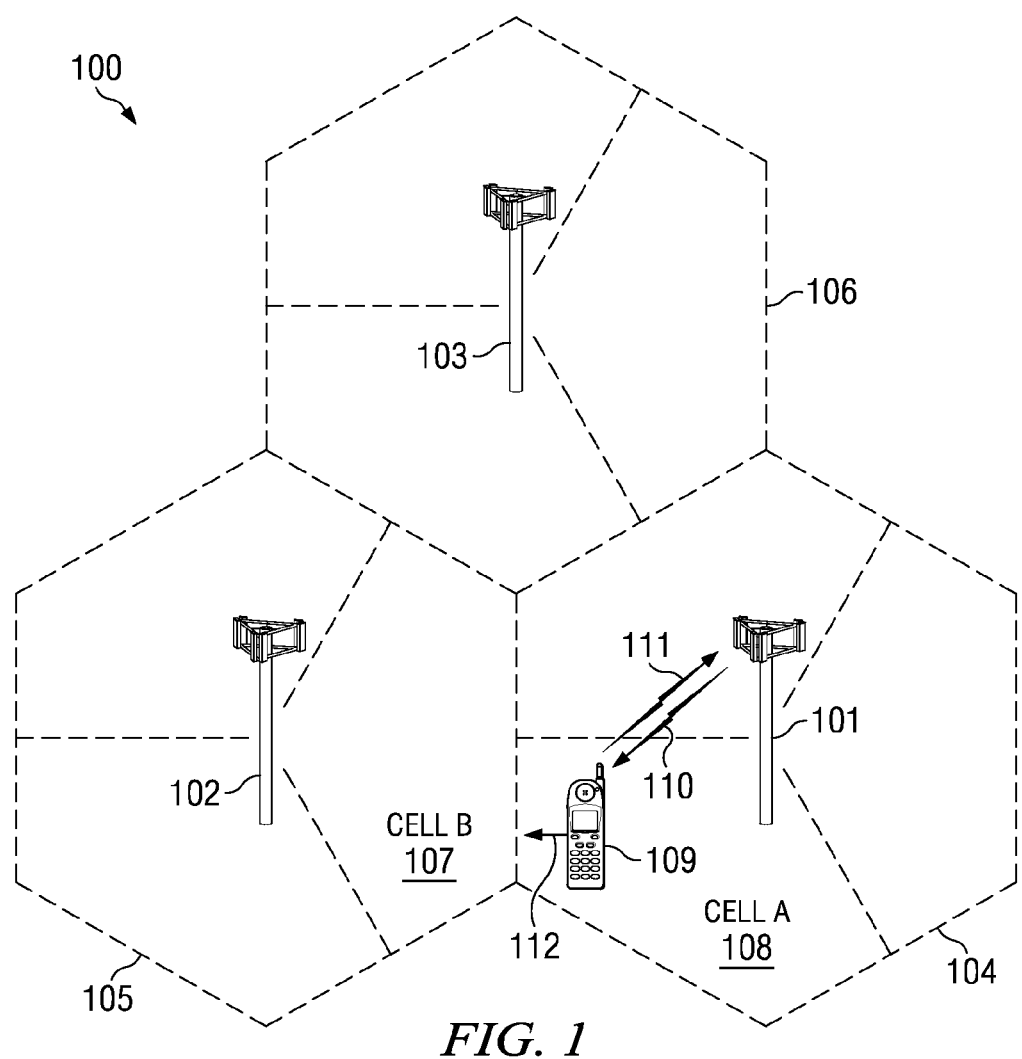
FIG. 1 is a pictorial of an illustrative telecommunications network that employs an embodiment of a mixed radix FFT unit with in-place data sample storage.

FIG. 1 shows an exemplary wireless telecommunications network 100. The illustrative telecommunications network includes representative base stations 101, 102, and 103; however, a telecommunications network necessarily includes many more base stations. Each of base stations 101, 102, and 103 are operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109 via downlink 110 and uplink 111. As UE 109 moves out of Cell A 108, and into Cell B 107, UE 109 may be handed over to base station 102. Because UE 109 is synchronized with base station 101, UE 109 must employ non-synchronized random access to initiate handover to base station 102. A UE in a cell may be stationary such as within a home or office, or may be moving while a user is walking or riding in a vehicle. UE 109 moves within cell 108 with a velocity 112 relative to base station 102.

In one embodiment, UE 109 is transmitting to and receiving transmissions from base station 101 using frame structures defined according to LTE standards. Base station 101 is typically receiving uplink transmissions from up to 500 or more mobile UE. In order to decode the control data and user data that is modulated onto the various radio frequency channels by the various UE, the base station uses a mixed radix FFT unit with in-place data sample storage, as will be described in more detail below.

DFT Background

Given an input sequence, $x_n$, an N-point discrete Fourier transform (DFT) is defined as $$X_k = \sum_{n=0}^{N-1} x_n \cdot W_N^{nk} \tag{1}$$

where k=0, 1, 2, ... N−1.

With an input, $X_k$, the inverse discrete Fourier transform (IDFT) is $$x_n = \sum_{k=0}^{N-1} X_k \cdot W_N^{-nk} \tag{2}$$

where n=0, 1, 2, ... N−1. Generally, n is the time index, and k is the frequency index. The coefficient, $W_N^{nk}$, is defined as $$W_N^{nk} = e^{-j \cdot 2 \cdot \pi \cdot n \cdot k / N} \tag{3}$$

The form of the inverse transform is identical to the forward transform and so we discuss only the DFT and assume the same techniques apply to the IDFT. The FFT in this embodiment supports both the DFT and IDFT.

A fast algorithm used to compute the DFT is called the fast Fourier transform (FFT). Generally, there are two ways to derive the FFT. One way is called a decimation in frequency (DIF) where multiple expressions are written for various sets of frequency results. A radix-2 DIF decomposition is written as $$X_{2k} = \sum_{n=0}^{N/2-1} (x_n + x_{n+N/2}) \cdot W_{N/2}^{nk} \quad (4)$$

$$X_{2k+1} = \sum_{n=0}^{N/2-1} (x_n + x_{n+N/2}) \cdot W_N^n \cdot W_{N/2}^{nk} \quad (5)$$

One notices that each equation, (equations (4) and (5)) is itself a DFT like in equation (1) but of length N/2. This type of decomposition can continue and does not necessarily need to be for powers of two.

Figure 2:
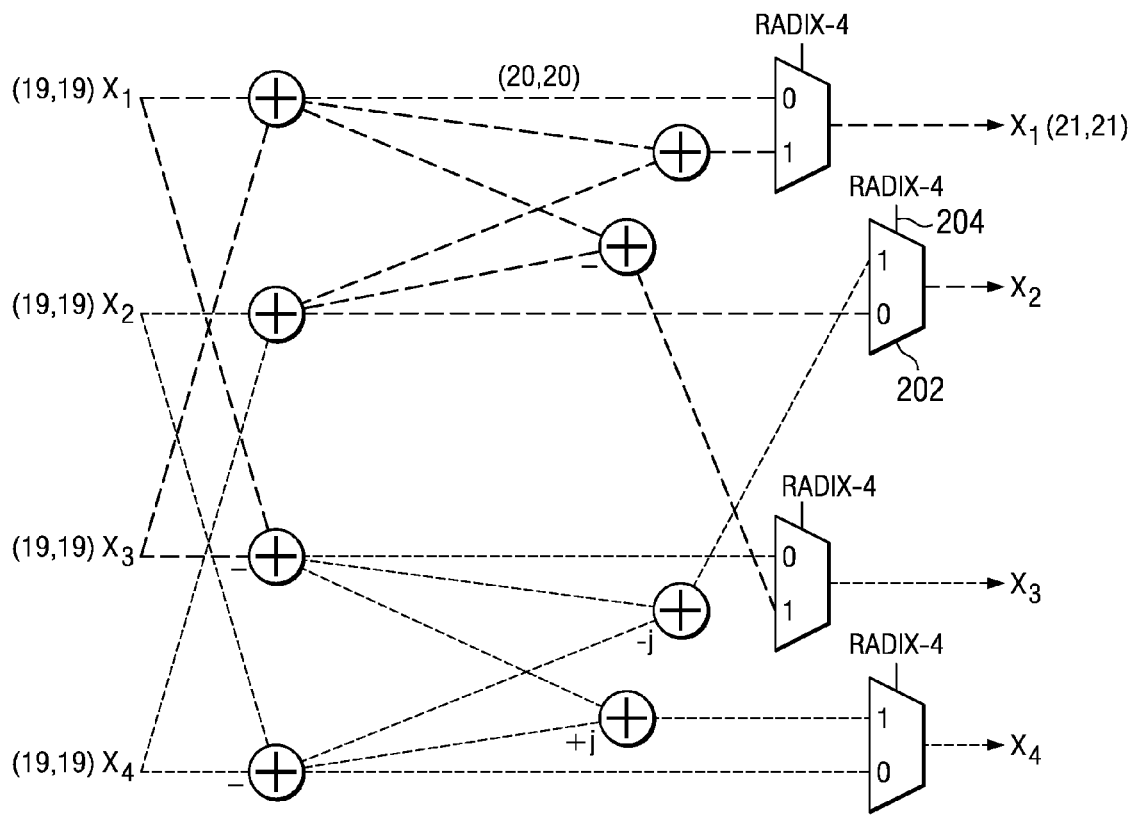
FIG. 2 illustrates a radix-2 and radix-4 FFT implemented on an exemplary embodiment of a mixed radix in-place FFT unit.

The radix-4 algorithm further decomposes the odd and even frequency components into $$X_{4k} = \sum_{n=0}^{N/4-1} (x_n + x_{n+N/4} + x_{n+N/2} + x_{n+3N/4}) \cdot W_{N/4}^{nk}$$

$$X_{4k+2} = \sum_{n=0}^{N/4-1} (x_n - x_{n+N/4} + x_{n+N/2} - x_{n+3N/4}) \cdot W_N^{2n} \cdot W_{N/4}^{nk}$$

$$X_{4k+1} = \sum_{n=0}^{N/4-1} (x_n - j \cdot x_{n+N/4} - x_{n+N/2} + j \cdot x_{n+3N/4}) \cdot W_N^n \cdot W_{N/4}^{nk}$$

$$X_{4k+3} = \sum_{n=0}^{N/4-1} (x_n + j \cdot x_{n+N/4} - x_{n+N/2} - j \cdot x_{n+3N/4}) \cdot W_N^{3n} \cdot W_{N/4}^{nk}$$

and is depicted as shown in FIG. 2, which illustrates a radix-2 and radix-4 FFT implemented on an exemplary embodiment of a mixed radix in-place FFT unit. In this embodiment, multiplexors indicated generally at 202 allow operation as either a radix-2 or radix-4 in response to control signal 204.

For radix-3, the DIF decomposition can be written $$X_{3k} = \sum_{n=0}^{N/3-1} (x_n + x_{n+N/3} + x_{n+2N/3}) \cdot W_{N/3}^{nk}$$

$$X_{3k+1} = \sum_{n=0}^{N/3-1} (x_n + x_{n+N/3} e^{-j2\pi/3} + x_{n+2N/3} e^{+j2\pi/3}) \cdot W_N^n \cdot W_{N/3}^{nk}$$

$$X_{3k+2} = \sum_{n=0}^{N/3-1} (x_n + x_{n+N/3} e^{+j2\pi/3} + x_{n+2N/3} e^{-j2\pi/3}) \cdot W_N^{2n} \cdot W_{N/3}^{nk}$$

Figure 3:
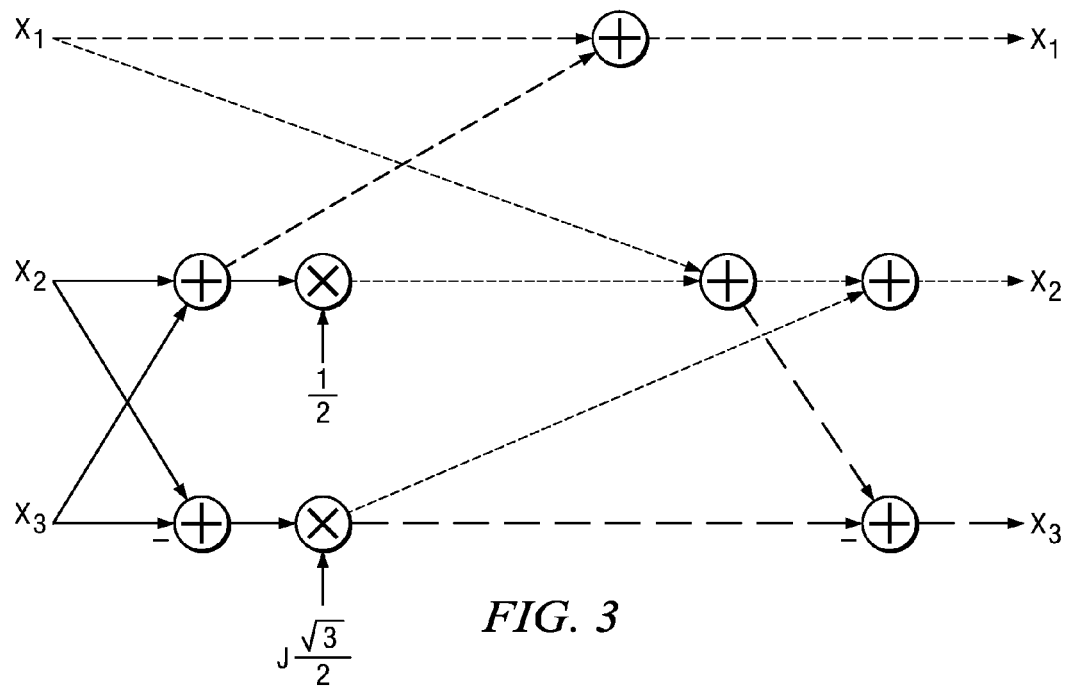
FIG. 3 illustrates a radix-3 FFT implemented on the exemplary FFT unit.

FIG. 3 illustrates a radix-3 FFT implemented on the exemplary FFT unit.

For radix-5, the DIF decomposition can be written $$X_{5k} = \sum_{n=0}^{N/5-1} (x_n + x_{n+N/5} + x_{n+2N/5} + x_{n+3N/5} + x_{n+4N/5}) \cdot W_{N/5}^{nk}$$

$$X_{5k+1} = \sum_{n=0}^{N/5-1} \left( \begin{array}{c} x_n + x_{n+N} e^{-j2\pi/5} + x_{n+2N/5} e^{-j4\pi/5} + \\ x_{n+3N/5} e^{+j4\pi/5} + x_{n+4N/5} e^{+j2\pi/5} \end{array} \right) \cdot W_N^n \cdot W_{N/5}^{nk}$$

$$X_{5k+2} = \sum_{n=0}^{N/5-1} \left( \begin{array}{c} x_n + x_{n+N/5} e^{-j4\pi/5} + x_{n+2N/5} e^{+j2\pi/5} + \\ x_{n+3N/5} e^{-j2\pi/5} + x_{n+4N/5} e^{+j4\pi/5} \end{array} \right) \cdot W_N^{2n} \cdot W_{N/5}^{nk}$$

-continued $$X_{5k+3} = \sum_{n=0}^{N/5-1} \left( \begin{array}{c} x_n + x_{n+N/5} e^{+j4\pi/5} + x_{n+2N/5} e^{-j2\pi/5} + \\ x_{n+3N/5} e^{+j2\pi/5} + x_{n+4N/5} e^{-j4\pi/5} \end{array} \right) \cdot W_N^{3n} \cdot W_{N/5}^{nk}$$

$$X_{5k+4} = \sum_{n=0}^{N/5-1} \left( \begin{array}{c} x_n + x_{n+N/5} e^{+j2\pi/5} + x_{n+2N/5} e^{+j4\pi/5} + \\ x_{n+3N/5} e^{-j4\pi/5} + x_{n+4N/5} e^{-j2\pi/5} \end{array} \right) \cdot W_N^{4n} \cdot W_{N/5}^{nk}$$

Figure 4:
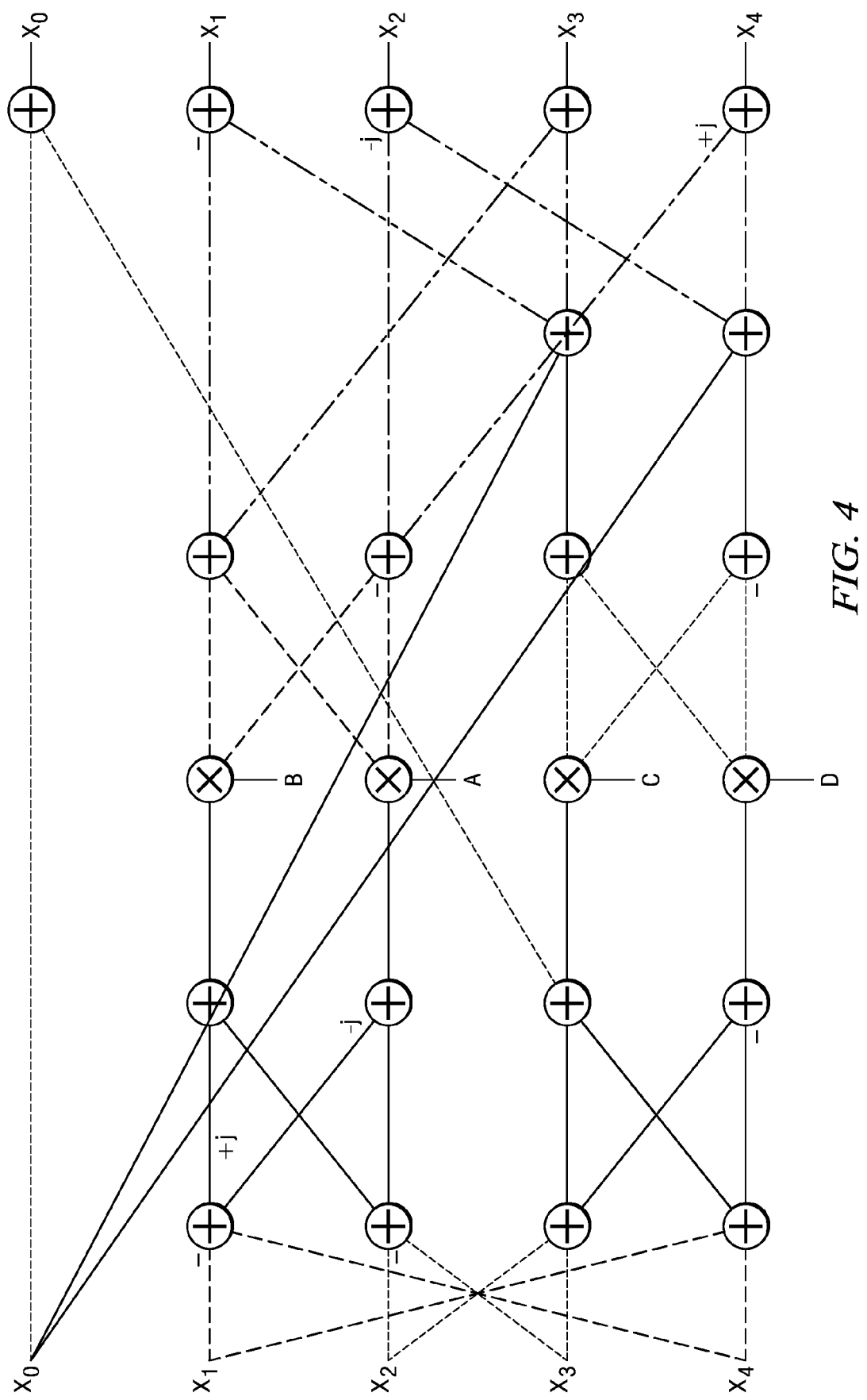
FIG. 4 illustrates a radix-5 FFT implemented on the exemplary FFT unit.

FIG. 4 illustrates a radix-5 FFT according to the Rader algorithm implemented on the exemplary FFT unit.

In all of the equations for radix-2, 3, 4, and 5 we see the derivation of the twiddle factors. These are the factors $W_N^{an}$ at the end of each expression where a is from 0 to the radix size minus one and N is the size of the transform.

Figure 5:
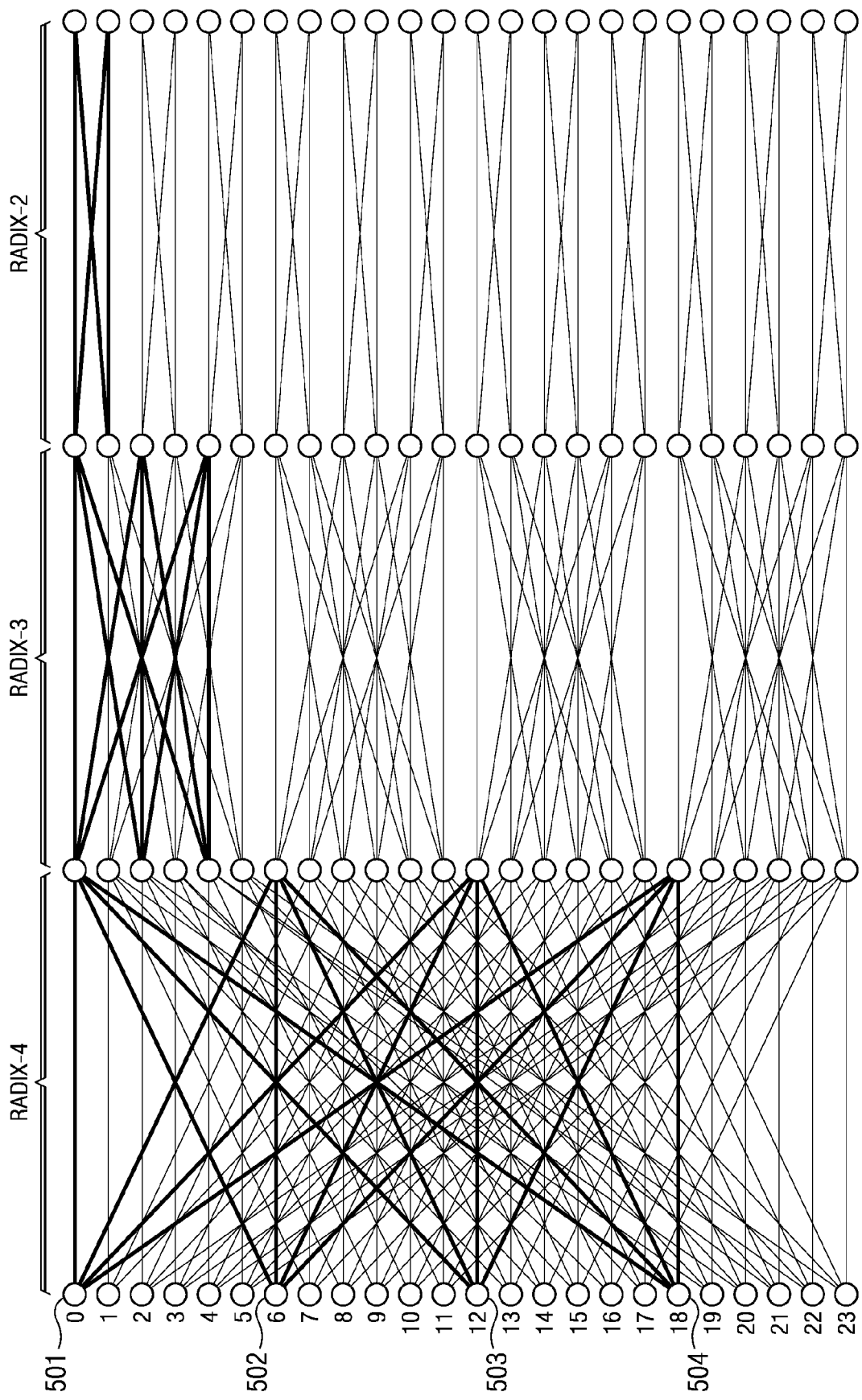
FIG. 5 illustrates an exemplary 96 point FFT implemented on the exemplary FFT unit.

FIG. 5 illustrates an exemplary 96-point FFT implemented on the exemplary FFT unit. In this example, a 96-point transform is divided using decimation in frequency into a radix-4 stage followed by a radix-3 stage followed by a radix-2 stage and a radix-4 stage. Each point represents four samples. The last radix-4 stage is not shown.

One skilled in the art will understand that the number of samples stored in each memory location will vary depending on the target speed of the design and the types of memory available. In the exemplary implementation, we store four samples in each memory location and exclude the last radix-4 stage from the proposed address calculation and bank calculation method. It would also be possible to store a different number of samples in each memory location and to include, therefore, different pre or post processing. The 96-point example shown here is effectively for a 24-point FFT with post-processing.

In this embodiment of the FFT unit, a single computation memory is used to hold all of the data samples of the DFT. The inputs to each radix stage are read from the same memory locations where the outputs will be written. This results in the data samples staying in place in the memory and conserves memory space. In order for the inputs to the butterflies to be in different memory banks at each stage, we need to read the data in a permuted order relative to where we write it.

The FFT unit uses an extension described herein of a memory addressing method described U.S. Pat. No. 5,091, 875 entitled "Fast Fourier Transform (FFT) Addressing Apparatus and Method" which is incorporated herein by reference. In this reference, a method is described for memory addressing to prevent memory bank conflicts for an $N=r^a$ size FFT—for a fixed-radix FFT. The extension described herein allows the use of mixed radix stages and thereby greatly increases the flexibility of the FFT unit. In this embodiment, the FFT unit supports radix-5, radix-4, radix-3, and radix-2 sizes.

In this embodiment, a decimation in frequency (DIF) derivation of the FFT algorithm is used. For a size N FFT, N is divided into factors, $r_0, r_1 \ldots r_{R-1}$ where R is the total number of factors. The values of r can be any values such that $$N = \prod_{i=0:R-1} r_i.$$

Each stage is a radix-$r_i$ stage and during a stage radix-$r_i$ butterfly is calculated. For example, for a 96-point transform, N is decomposed into the factors $[r_0, r_1, r_2, r_3] = [4, 3, 2, 4]$ where the stages are in left to right order starting with stage zero (0). There are always $r_i$ inputs and outputs for every radix-$r_i$ butterfly.

At the input to stage s, $$K_s = \prod_{i=0:\, s-1} r_i$$

transforms of length $$N_s = \prod_{i=s:\, R-1} r_i$$

are performed, where $K_0=1$ and $N_0=N$. With the 96-point example, in stage 0, a $K_0=1$ radix-4 transform of length $N_0=96$ is done, followed in stage 1 by $K_1=4$, radix-3 transforms of size $N_1=24$, followed in stage 2 by $K_2=12$, radix-2 transforms of size $N_2=8$ followed, in stage 3 by $K_3=24$, radix-4 transforms of size $N_3=4$. In every transform, there are $N_s/r_i$ butterflies to calculate.

Figure 6:
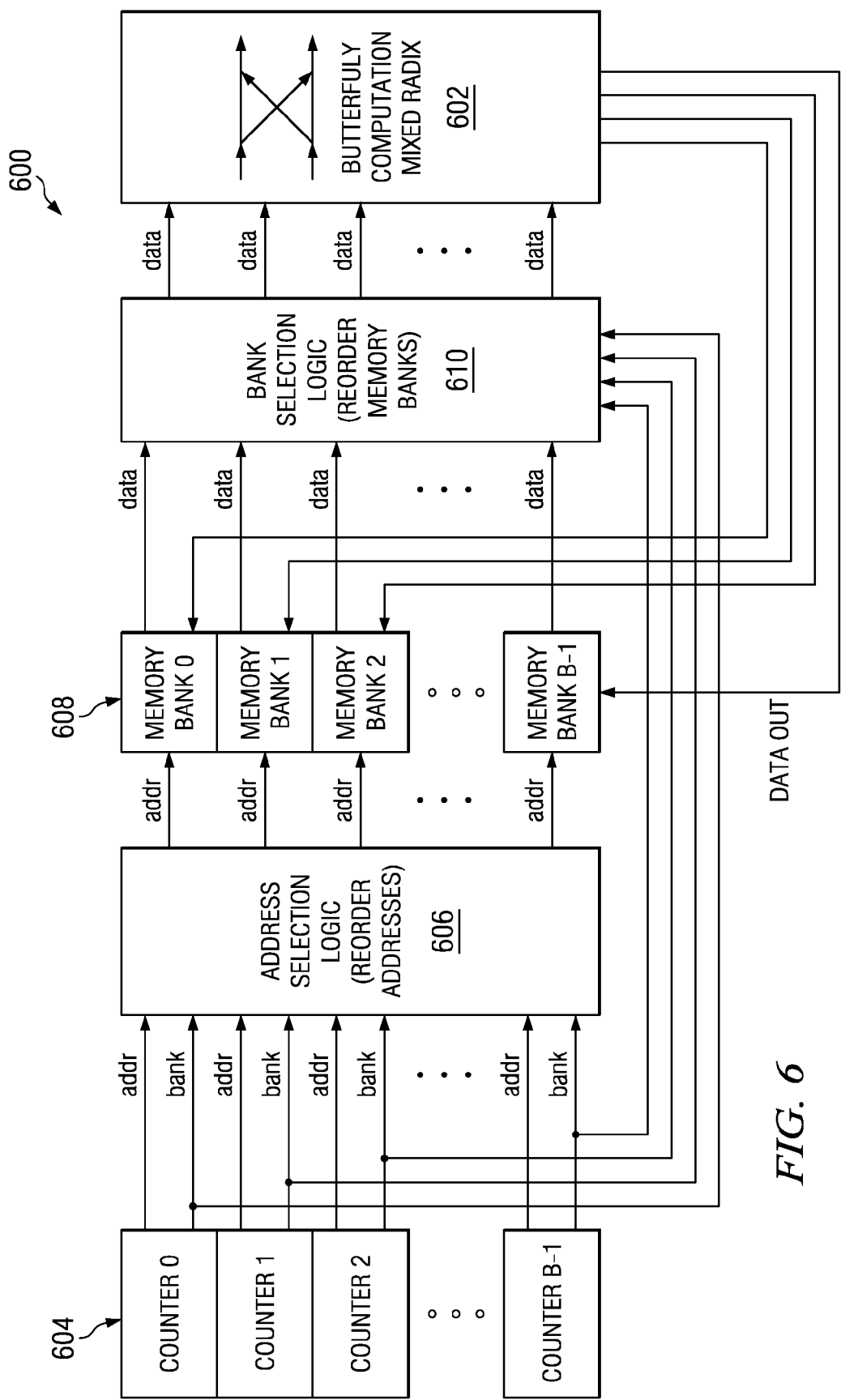
FIG. 6 is a block diagram of the exemplary FFT unit.

FIG. 6 is a block diagram of the exemplary FFT unit. This embodiment of the FFT unit can calculate two radix-4, two radix-3, four radix-2, or one radix-5 butterfly in every clock cycle in butterfly computation logic 602. The general operation of butterfly computation units is known and therefore will not be described further herein. Continuing with the same example, in the second stage (stage=1) four radix-3 transforms of size 24 are done. This means that in each transform the FFT unit needs to calculate 24/3=8 radix-3 butterflies which will take 4 clock cycles. Since there are four transforms in this stage, the stage takes 4*4=16 clock cycles (not including any implementation pipeline delays).

A data sample storage buffer 608 is portioned into B banks, one bank for each data sample needed for a butterfly computation. In this embodiment, the largest supported butterfly radix is five, therefore data sample storage buffer 608 is partitioned into five banks to provide five data samples in a simultaneous manner to butterfly computation logic 602. Bank selection logic 610 provides data path multiplexing under control of counters 604 to allow the data samples to be selected from particular banks as the calculation progresses.

In this embodiment of the FFT unit, the data samples output from the butterfly computation logic are written back to the memory banks at the same address from which the data samples were read for the butterfly calculation. In this manner, only one storage location is required for each of the N data samples during the entire FFT computation.

Counters 604 are used to govern the computations. They keep track of the transform number, the butterfly number within each transform, and the input indices to each butterfly (address and memory bank). From the counter digits, the memory bank and the address into each memory bank used for the calculations is determined. The counter can be defined as $$ctr = p_0, p_1, p_2 \ldots p_{R-1} \quad (6)$$

for R radix stages where $p_i$ are the counter digits and each digit counts from 0 to $r_i-1$ (base-$r_i$).

The R counter digits can be thought of as being divided into three parts. The parts are the transform number, k, the butterfly number, n, and the input index into the butterfly, m. The counter in equation (6) can be rewritten as $$ctr = k_{s-1}, \ldots k_0, m, n_0, n_1, \ldots n_{R-s-2} = [kmn]$$

In the second stage, stage s=1, for example, and there were four radix stages, the counter would look like $$ctr = k_0, m, n_0, n_1 = [kmn]$$

Each digit is a base-$r_i$ number where i is the digit position within ctr. Notice the ordering of the bits—the digits of k are in order. The digits of n are in reversed order.

Counting is done first for the indices within each transform, n, and then by transform number, k. The values of m represent the input number to the butterfly.

In this embodiment of the FFT unit, the last radix stage is always radix-4. All sizes supported by the FFT unit have a factor of four in them. When a memory location is read, four samples are obtained. Except for the last radix-4 stage, no other radix stages ever use more than one sample at a time from one memory location. Therefore, the last stage does not need to be considered when looking at addressing. Therefore, for an FFT of size N, addressing for an FFT of size N'=N/4 is done. For the 96-FFT example, addressing for an N'=24-point transform is performed, as illustrated in FIG. 5.

Using this example, the input indices to the first stage (s=0) are ctr=[m, $n_0$, $n_1$]=[$0_4$, $0_3$, $0_2$], [$1_4$, $0_3$, $0_2$], [$2_4$ $0_3$ $0_2$], [$3_4$ $0_3$ $0_2$] or 0, 6, 12, 18 then ctr=[$0_4$, $1_3$, $0_2$], [$1_4$, $1_3$, $0_2$], [$2_4$ $1_3$ $0_2$], [$3_4$, $1_3$, $0_2$] or 2, 8, 14, 20 and this continues through ctr=[$0_4$, $2_3$, $1_2$], [$1_4$, $2_3$ $1_2$], [$2_4$, $2_3$, $1_2$], [$3_4$, $2_3$, $1_2$], =5, 11, 17, 23. Each set of, in this case, four inputs are the four inputs to the radix-4 butterfly as indicated by m. This can be thought of as four different counters—all with the same n and k values but a different m. In general, there are B counters for B memory banks. For this embodiment of the FFT unit, the largest value of B is five.

FIG. 6 illustrates how counters 604 determine the address and memory bank numbers. This determines which data is used by butterfly computation logic 602 for each butterfly computation. Referring again to the 96 point example, what this means is that the first radix-4 butterfly takes inputs from memory locations 0, 6, 12, and 18. In this implementation, there are four samples per memory location in each bank of data sample memory 608. Therefore, each butterfly illustrated in FIG. 5 is actually four butterflies. For example, the radix-4 butterfly using data samples 0, 6, 12, 18 indicated respectively at 501-505 with bold lines is actually four radix-4 butterflies using input data samples 0a, 6a, 12a, 18a . . . 0d, 6d, 12d, 18d. In this embodiment with (19, 19) bit samples, each bank storage location contains at least 152 bits.

The next stage, s=1, has $K_1$=4, radix-3 transforms of size $N_1$'=6. For the first radix-3 transform, $k_0$=0 and the input indices for each FFT are idx=[$k_0$, m, $n_0$]=[$0_4$, $0_3$, $0_2$], [$0_4$, $1_3$, $0_2$,], [$0_4$, $2_3$, $0_2$,] or 0, 2, 4. This is shown in bold lines in FIG. 5. Again, there are always four samples per memory location and so this represents four, radix-3 butterfly computations.

Figure 7:
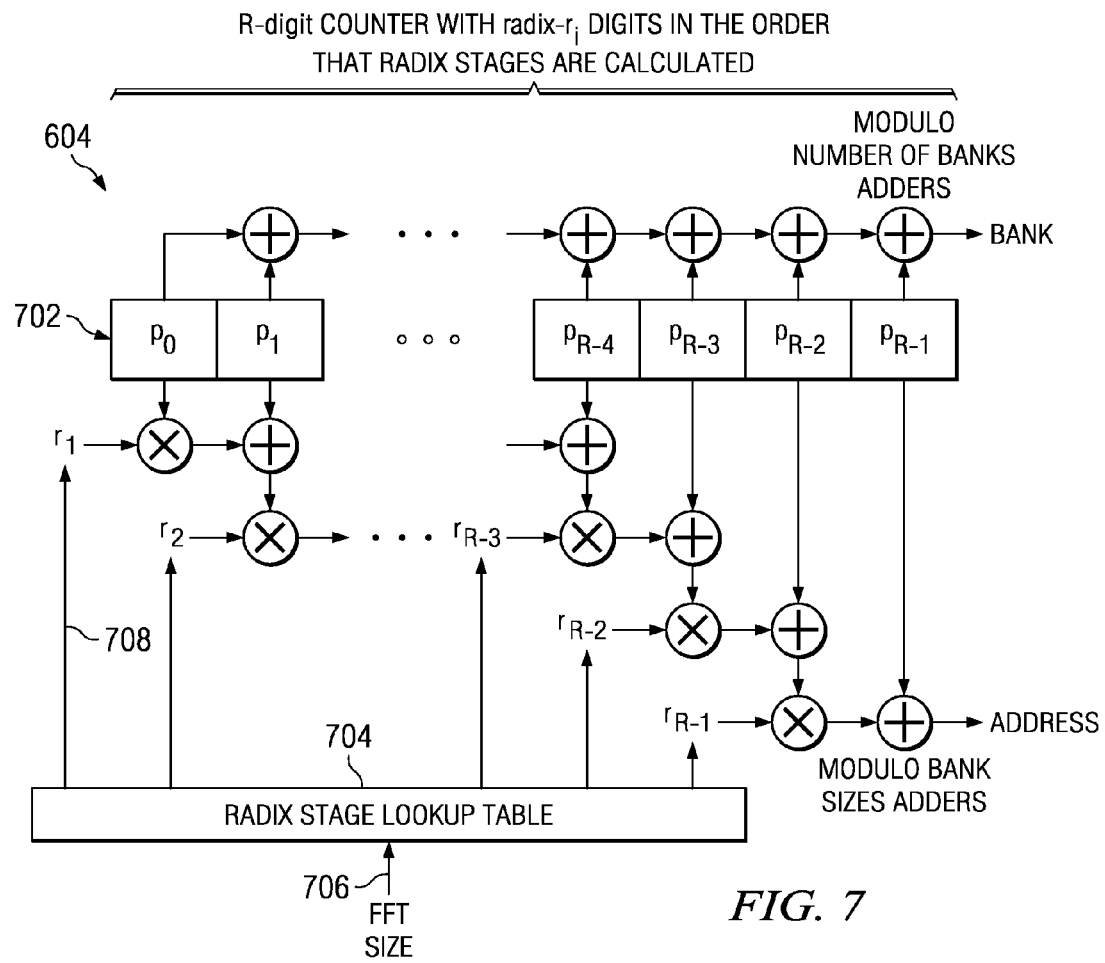
FIG. 7 is a block diagram of an R-digit counter for determining bank addressing in the FFT unit.

FIG. 7 is a block diagram of an R-digit counter 604 for determining bank addressing in the FFT unit and illustrates how the address and memory banks are calculated from the counter digits. The R-digits are indicated generally at 702. Radix stage lookup table 704 receives an indication of the FFT size via size signal 706 and provides a radix size indicated generally at 708 for each stage of the sequence of mixed radix FFTs. Each digit 702 receives a radix size indicative to the corresponding radix stage. The table may be implemented in read only memory, electrically alterable read only memory, or in other suitable memory circuitry. For each FFT size supported by the FFT unit, the table provides an order set of radix size outputs that correspond to the product of R sequential mixed radix stages of radix-r(i).

Figure 8:
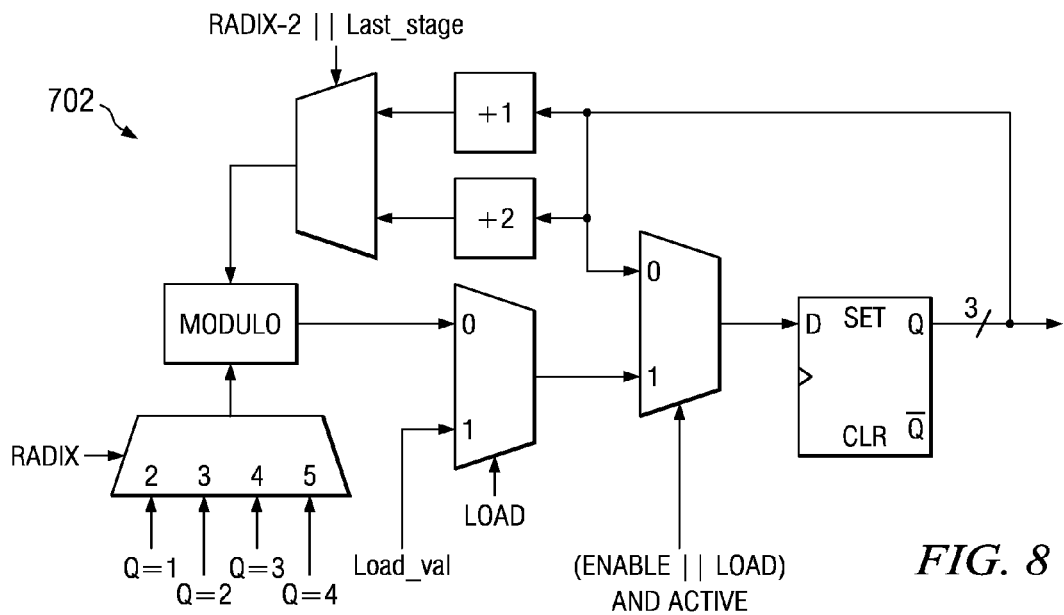
FIG. 8 is an exemplary schematic of a portion of the R-digit counter.

FIG. 8 is an exemplary schematic of one digit 702 of the R-digit counter 604.

Selecting the Memory Bank

It can be insured that the inputs to each radix stage are in separate memory banks by using the memory bank numbers [($p_0+p_1+p_2+ \ldots p_{R-1}$) mod nbanks] where nbanks are the number of memory banks. This is shown in FIG. 7. If the radix for all stages is the same, then nbanks=$r_i$=r. In this embodiment of the FFT unit, the number of banks is always equal to the first radix stage, therefore nbanks=$r_0$. To simplify implementation, each bank may be split into two or more, for example, to reduce the size of the multiplexors, but the concept is the same.

Ordering the Radix Stages

Ignoring the last radix-4 stage, the first stage is always the largest radix stage. That is, the first stage is radix-5 when there is a radix-5 stage, or a radix-4 stage when there is a radix-4 stage, or a radix-3 stage only when there are no radix-4 stages and no radix-5 stages.

The reason the first stage must always be the largest stage in this embodiment has to do with the way the address and bank are calculated. Every sample must have a unique address and memory bank number. The number of memory banks must be equal to the largest radix size so that when doing transforms using the largest radix size, there will be as many banks as there are required inputs. When the first stage is the largest stage, it is certain that for a counter in which only the first digit is changed, the address will not change because the address is modulo the bank size and the number of banks is equal to the first stage. Furthermore, because the bank size is equal to N/$r_0$, when the first digit of the counter is fixed and all of the other digits are cycled through, it is known that they will all result in different addresses because the combined values of the other digits can't be higher than N/$r_0$.

If the first stage were not the largest stage, the address could change if only the first digit is changed. For example, if the ordering of the radix stages were [3 4 2] for a size 24-DFT and there are 4 banks of size 6, the address/bank of counter values [2 1 0] is (18 modulo 6=0)/(2+1+0 modulo 4=3) and the address/bank for counter values [1 2 0] also has an address/bank of (12 modulo 6=0)/(1+2+0 modulo 4=3).

Within each radix stage, s, $K_s$ DFTs are performed. The memory banks and addresses are selected so that two butterflies per cycle can be calculated. However, in the exemplary implementation, it is desirable to be able to calculate four radix-2 butterflies per cycle.

The order that the DFTs are done does not change the result in any way. The order can be changed so that there are no memory bank conflicts when doing the radix-2 stage.

Selecting the Address

For each butterfly in stage s, the twiddle factor inputs are $W_{N_s}^{n'}, W_{N_s}^{2n'}, \ldots W_{N_s}^{(r_s-1)n'}$ where n'=the value formed from the radix digits $p_{s+1}, p_{s+2}, p_{R-1}$. For stage R-1, n'=0. Recall that $$N_s = \prod_{i=s:\,R-1} r_i.$$

Another way of writing this is to say that the twiddle factor inputs are $W_N^{n''}, W_N^{2n''}, \ldots W_N^{(r-1)n''}$ where n''=[$p_{s+1}, p_{s+2}, \ldots p_{R-1}\, 0_0 \ldots 0_{s-1}$] and the zeros are base-i zeros where i is the subscript of the zero. It is written this way because tables of $W_N$ are stored in memory (not $W_{N_s}$).

Although it is not the only choice, one option for the address within the memory bank is to use all but the most significant digit in ctr repeated here for convenience.

$$ctr = p_0, p_1, p_2 \ldots p_{R-1}$$

Figure 9:
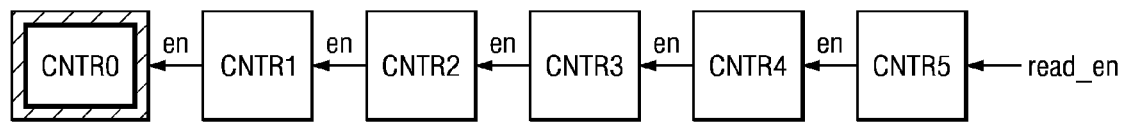
FIG. 9 illustrates operation of the counter during FFT calculations in the first radix stage.
Figure 10:
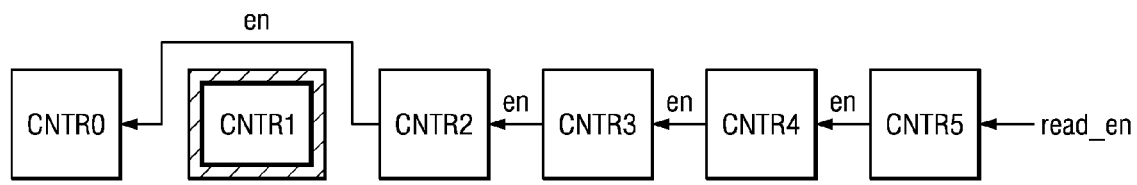
FIG. 10 illustrates operation of the counter during FFT calculations in the second radix stage.

For example, during stage s=0, the address would be the value derived from the radix digits $p_1, p_2, \ldots p_{R-1}$ (or $p_{R-1}, p_{R-2}, \ldots p_1$—the order does not matter). This way, n' and the address are the same except for the MSBs. FIG. 9 illustrates operation of the counter during FFT calculations in the first radix stage. FIG. 10 illustrates operation of the counter during FFT calculations in the second radix stage.

Doing this requires that there be $r_0$ memory banks which means that the number of banks must equal or be a multiple of the first radix stage. Because the number of banks must be a multiple of the largest radix stage so that during that stage, enough values are read to allow a full radix stage is calculated each clock cycle, this means, ignoring the last radix-4 stage, that the largest radix stage must go first.

In the 96-FFT example, there are four banks with six addresses in each bank (and each memory location contains four samples). The input indices to the first stage (s=0) are ctr=[$0_4, 0_3, 0_2$], [$1_4, 0_3, 0_2$], [$2_4\, 0_3\, 0_2$], [$3_4\, 0_3\, 0_2$] with memory banks 0, 1, 2, 3 (adding the digits modulo four) and address 0, 0, 0, 0 (looking at all but the most significant digit). Then ctr=[$0_4, 1_3, 0_2$], [$1_4, 1_3, 0_2$], [$2_4\, 1_3\, 0_2$], [$3_4, 1_3, \mathbf{0}_2$] with banks 1, 2, 3, 0 and addresses 2, 2, 2, and 2. And this continues through ctr=[$0_4, 2_3, 1_2$], [$1_4, 2_3, 1_2$], [$2_4, 2_3, 1_2$], [$3_4, 2_3, 1_2$], = 5, 11, 17, 23 with banks 3, 0, 1, 2 and addresses 5, 5, 5, and 5.

In the second stage of the 96-FFT example there are K=4, radix-3 stages. There are still four banks and six addresses in each bank. The input indices to the second stage (s=1) are ctr=[$0_4, 0_3, 0_2$], [$0_4, 1_3, 0_2$], [$0_4\, 2_3\, 0_2$] with memory banks 0, 1, 2 and addresses 0, 2, 4. Then ctr=[$1_4, 0_3, 0_2$], [$1_4, 1_3, 0_2$], [$1_4\, 2_3\, 0_2$] with addresses (6, 8 and 10 modulo 6)=0, 2, 4 from banks 1, 2, and 0.

Figure 12:
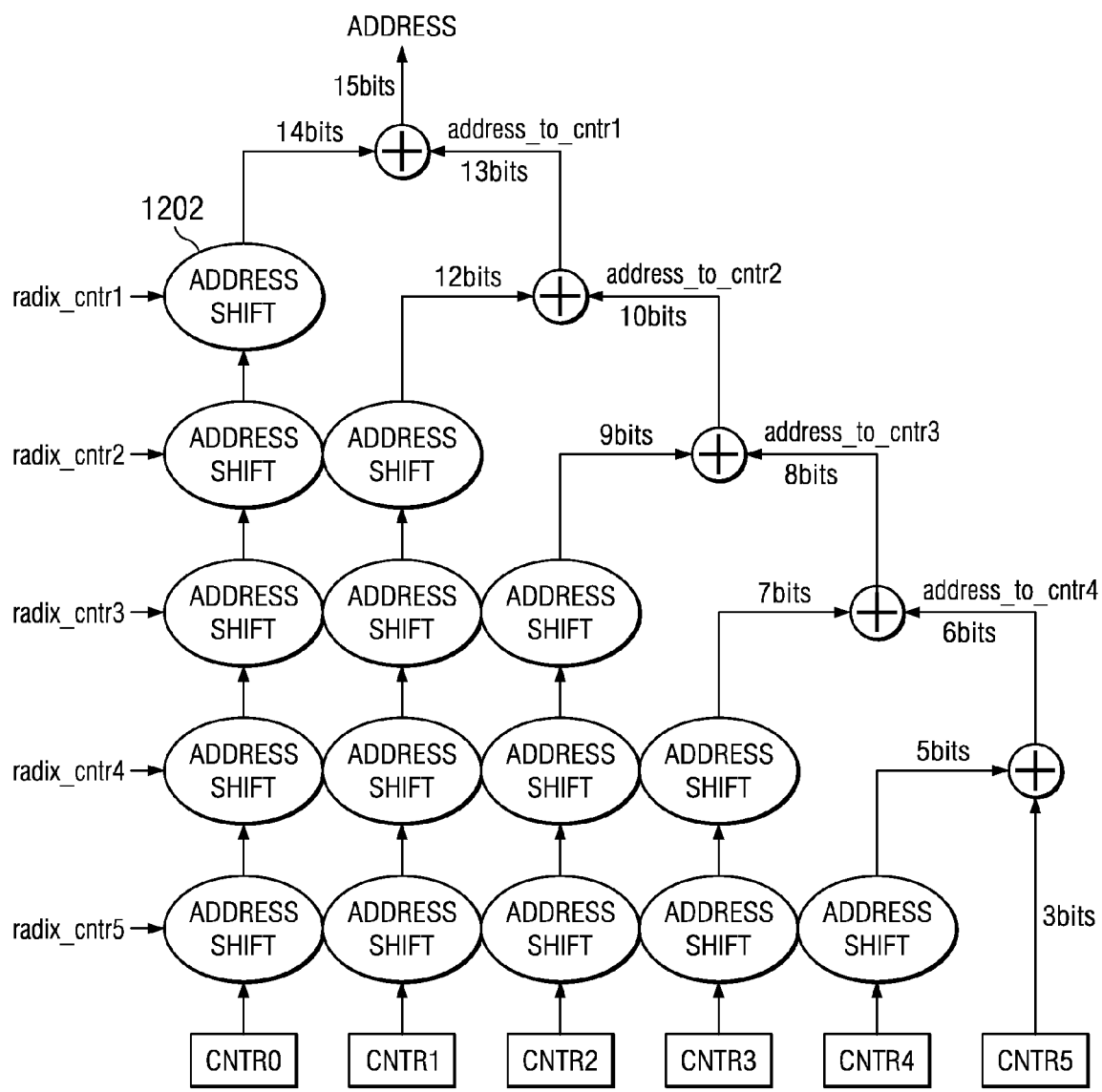
FIG. 12 is an exemplary schematic of address calculation.

FIG. 12 is an exemplary schematic of address calculation. For every address/bank calculation a data shift, indicated generally at 1202, is performed on the counters assembling the address/data. The FFT unit supports FFT sizes that are not a power of two, and therefore some of the stages are of radix-3 and radix-5. This implies that the shift 1202 is actually a multiplication by a parameter that can be an odd number, and different from one FFT size to the other. In order not to use multipliers the address calculation architecture illustrated in FIG. 12 is used.

Figure 13:
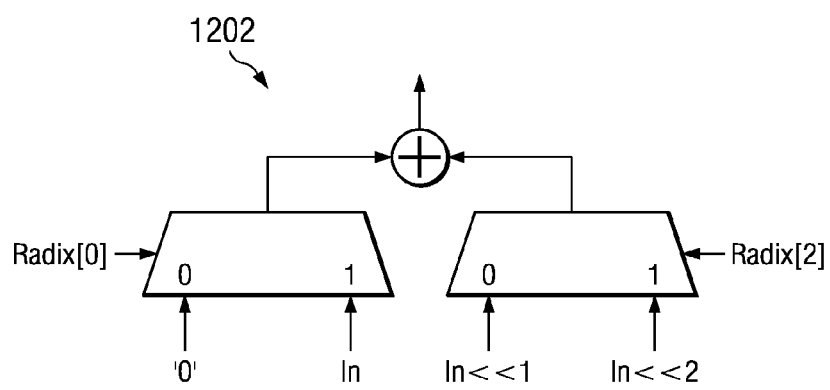
FIG. 13 is a schematic of address shifters used in the calculation circuit of FIG. 12.

FIG. 13 is a schematic of address shifters 1202 used in the calculation circuit of FIG. 12.

Input Addressing

The input to the FFT unit arrives in linear order four samples at a time. The four samples are written to one memory location as described earlier because each memory location holds four samples. As input values come in, the counter increments in a normal linear order with the least significant digit counting first. The first value is [0 0 0 . . . 0] then [0 0 0 . . . 1] etc. Therefore the first address/bank is 0/0 and the second address/bank is 1/1.

Output Addressing

Figure 11:
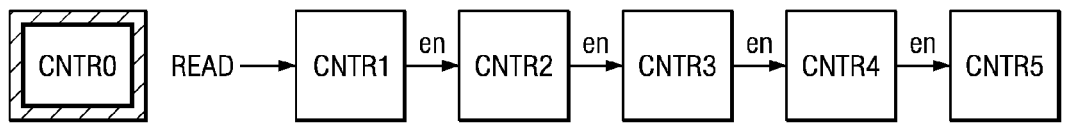
FIG. 11 illustrates operation of a counter while transferring completed FFT data from the in-place storage buffer.

FIG. 11 illustrates operation of the counter while transferring completed FFT data from the in-place storage buffer to system memory. For output data address generation, another set of address counters is used. For output address generation the counters are connected as illustrated in FIG. 11.

The output of the FFT unit is in digit reversed order. The index, ctr, is incremented by incrementing the left-most digit first. In this case, ctr=[$p_{r0}, p_{r1}, \ldots, p_{r(R-1)}$]. For the output, the samples in one memory location are no longer adjacent. The counter is cycled through four times reading first the first sample in the memory location, then the second, then the third and the fourth.

For the 96-FFT example, the left-most digit is incremented first and so the index is formed is shown in Table 1.

TABLE 1

Address generation example for output addressing

[$0_4, 0_3, 0_2$] → address = 0, bank = 0, first sample in the memory location
[$1_4, 0_3, 0_2$] → address = 0, bank = 1, first sample in the memory location
...
[$3_4, 0_3, 0_2$] → address = 0, bank = 3, first sample in the memory location
[$0_4, 1_3, 0_2$] → address = 2, bank = 1, first sample in the memory location
[$1_4, 1_3, 0_2$] → address = 2, bank = 2, first sample in the memory location
...
[$3_4, 1_3, 0_2$] → address = 2, bank = 0, first sample in the memory location
...
[$2_4, 2_3, 1_2$] → address = 5, bank = 1, first sample in the memory location
[$3_4, 2_3, 1_2$] → address = 5, bank = 2, first sample in the memory location
[$3_4, 2_3, 1_2$] → address = 5, bank = 2, first sample in the memory location
[$0_4, 0_3, 0_2$] → address = 0, bank = 0, second sample in the memory location
...
[$3_4, 2_3, 1_2$] → address = 5, bank = 2, fourth sample in the memory location When the first stage is a radix-4 stage, four memory locations will be read per clock cycle and only one sample is taken per memory location to read out. It is guaranteed that these will be four different banks because the first digit is different. The four samples are then transferred to system memory external to the FFT unit.

When the first stage is a radix-5 stage, five memory locations are read per clock cycle. Because the bus to system memory is four samples wide, this means that every fifth cycle, the transfer to system memory does not need to read the FFT unit memories. A shift register holds the left over samples.

When the first stage is a radix-3 stage, three memory locations are read per clock cycle. In this case, every fourth cycle the FFTC memory is read but there is not a write the system memory.

Twiddle Factors

Twiddle factors are stored internally in the FFT unit engine. This means that a controlling digital signal processor (DSP) does not need to load twiddle factors each time it changes the FFT block size.

For an N-point DFT, there are N/4 unique real values we need to store representing sin(0) to $$\sin\left(\frac{\pi}{2}\right).$$

They can be stored in two banks of memories, each length N/8 as sin(0) to $$\sin\left(\frac{\pi}{4}\right)$$

and cos(0) to $$\cos\left(\frac{\pi}{4}\right).$$

All of the twiddle factors can be derived from these values using the properties:

$$\sin(a) = -\sin(a)$$
$$\cos(a) = \cos(-a)$$
$$e^{-ja} = \cos(a) - j\sin(a)$$
$$e^{+ja} = \cos(a) + j\sin(a)$$
$$\cos(a) = \sin\left(\frac{\pi}{2} + a\right)$$

As indicated earlier, every clock cycle, the FFT unit calculates one of the following: two radix-4 butterflies, two radix-3 butterflies, one radix-5 butterfly, or four radix-2 butterflies.

For the two radix-4 butterflies, the following twiddle factors need to be available each cycle:

$$W_N^{an}, W_N^{2an}, W_N^{3an}, W_N^{a(n+1)}, W_N^{2a(n+1)}, W_N^{3a(n+1)}$$

The radix-3 butterflies need $$W_N^{an}, W_N^{2an}, W_N^{a(n+1)}, W_N^{2a(n+1)}$$

and the radix-5 butterfly needs $$W_N^{an}, W_N^{2an}, W_N^{3an}, W_N^{4an}$$

Because the radix-2 stage, if present, is always second-to-last, the twiddle factors are constant and don't need to be considered.

The factor "a" is included because every radix stage, the value of N is reduced by the size of the previous radix stage and $W_{N/a}^n = W_N^{an}$.

Each clock cycle, six values need to be read to do the two radix-4 butterflies, four values for the two radix-3 butterflies and four values for the one radix-5 butterfly. Organization of the memory to read the values needed each cycle is challenging.

A relatively straightforward method of storing the twiddle factors would be to have six sets of look-up tables, four corresponding to size N for the factors $W_N^{an}$, $W_N^{3an}$, $W_N^{a(n+1)}$, $W_N^{3a(n+1)}$ or $W_N^{an}$, $W_N^{a(n+1)}$, $W_N^{a(n+2)}$, $W_N^{a(n+3)}$ and two with size N/2 for the factors $W_N^{2an}$, $W_N^{2a(n-1)}$ which require half as much memory because, effectively, this is for a size N/2 DFT. The straightforward method uses, assuming 15-bit twiddle factors and minimum storage perset, 4×N/4×15+2×N/8×15≈19×N bits.

For reference, the smallest possible number of unique values we need to store for any one DFT size would be N/4×15≈4×N bits.

For an 8192 DFT, for example, this is 155 kbits as opposed to 32 kbits as the minimum.

Figure 14A:
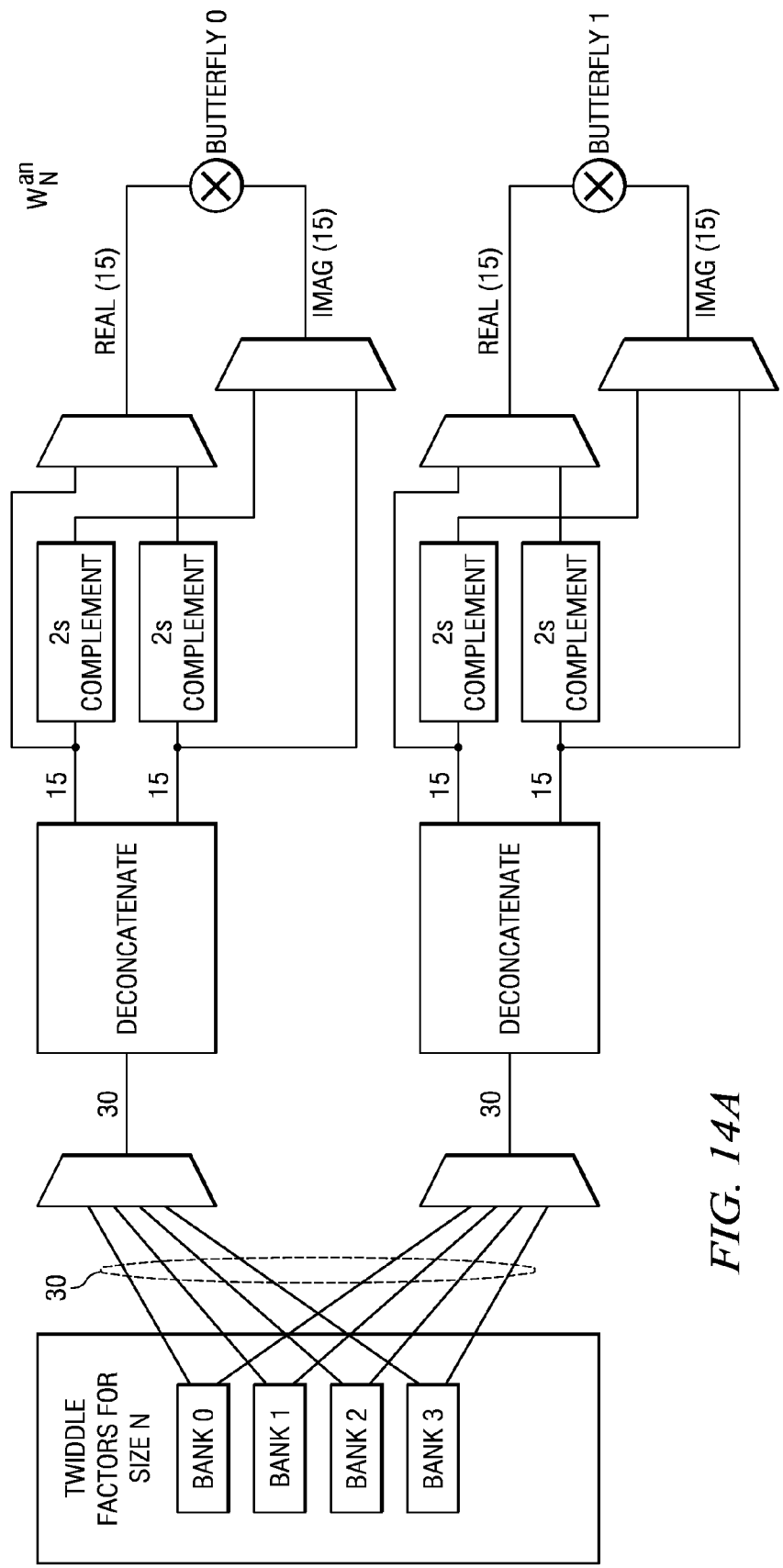
FIGS. 14A-C illustrate twiddle factors are stored and used during a radix-4 FFT on the exemplary FFT unit.
Figure 14B:
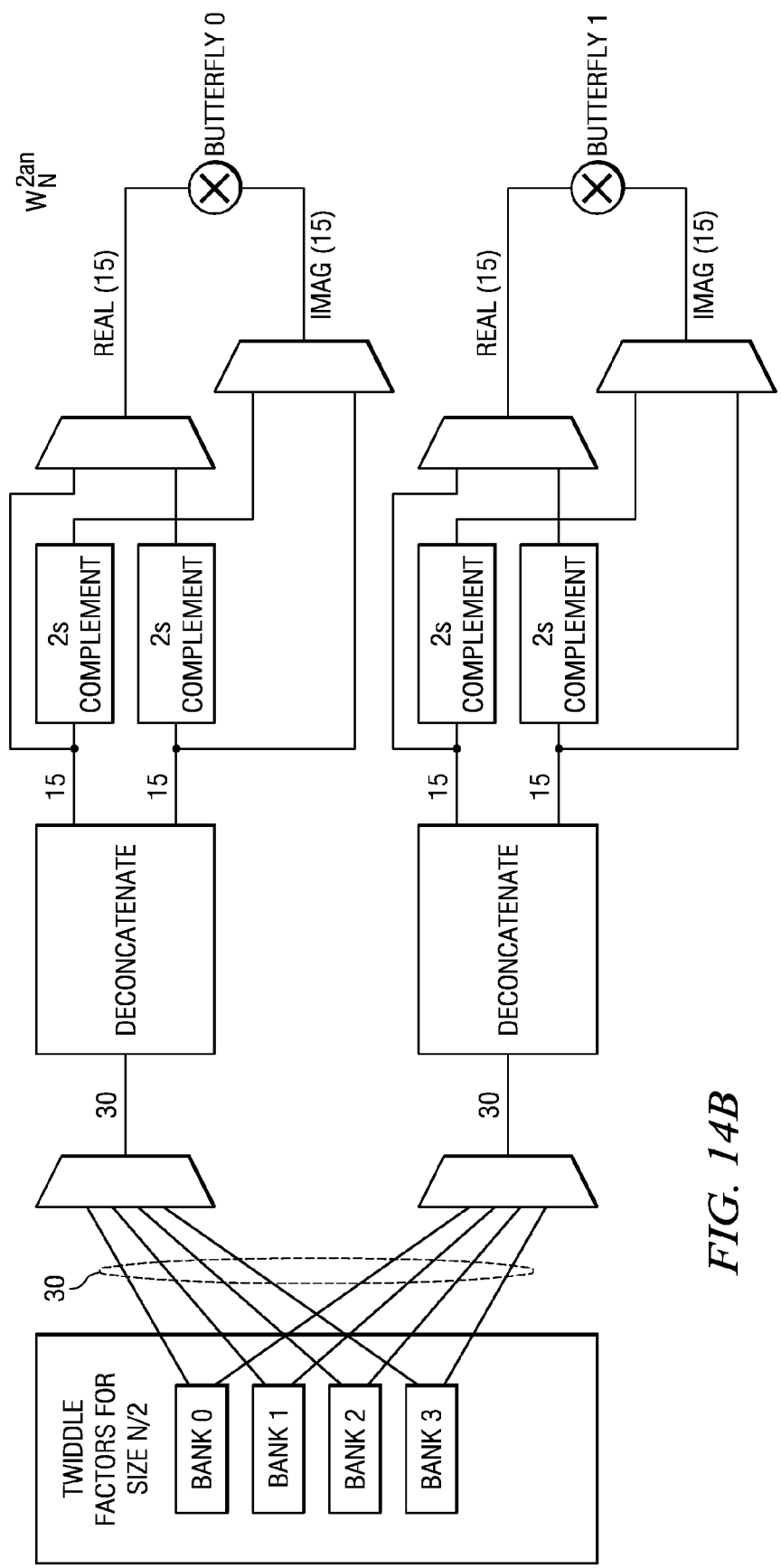
Figure 14C:
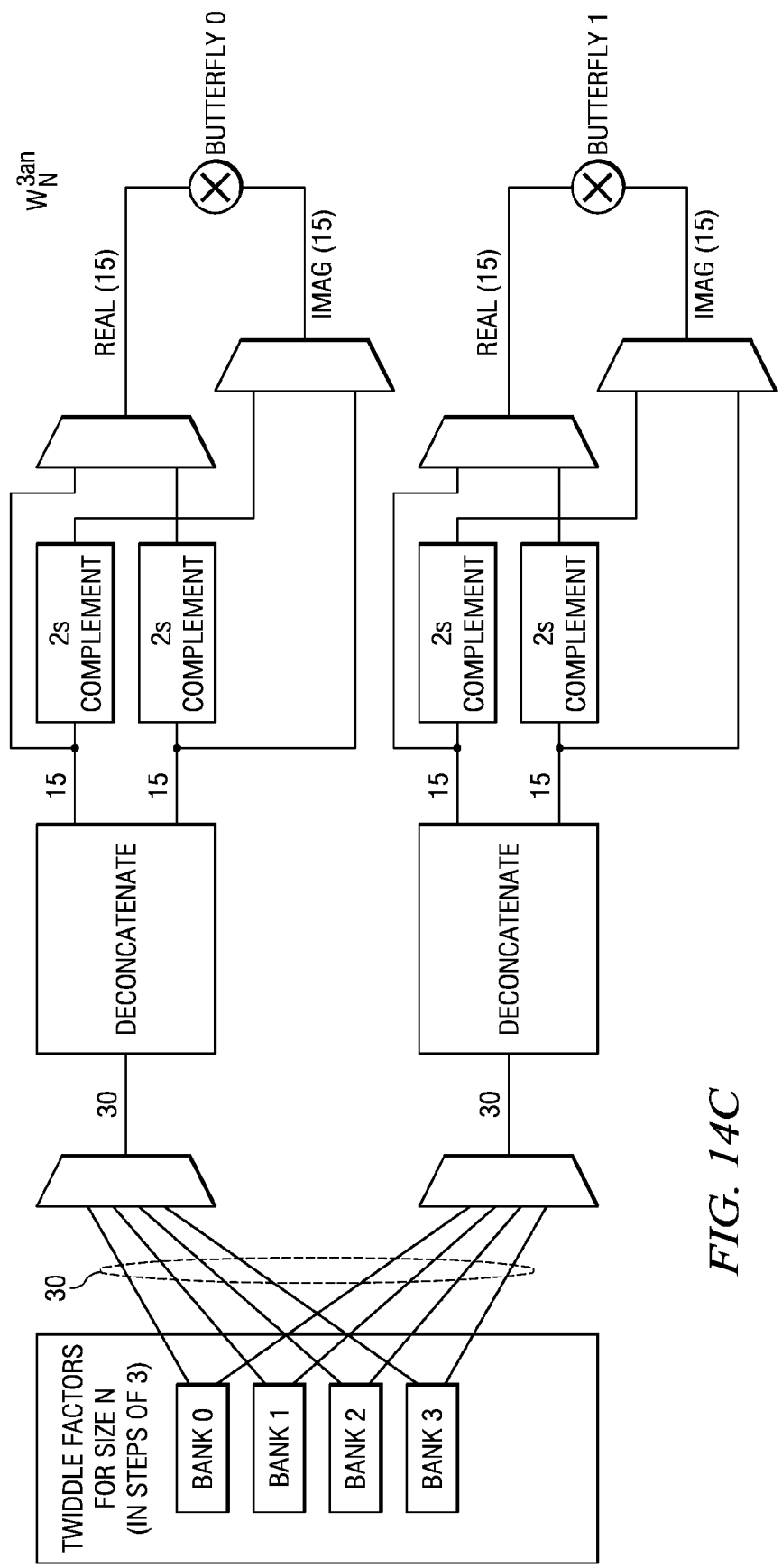

The method used in this embodiment to store the twiddle factors falls somewhere between the straightforward and the minimum possible. Using the same memory bank principles used for the data, there is only need to store the twiddle factors for one butterfly. By storing these in four different memory banks, the FFT unit can read the data for two butterflies during one clock cycle. This improves on the straightforward method by reducing to about 10×N the number of bits required which would be 81920 bits for an 8192 DFT. The general method is shown in FIGS. 14A-C To ensure that the twiddle factors for the two butterflies are always in different banks, the twiddle factors are stored in eleven different tables corresponding to eleven prime DFT sizes. The eleven sizes are shown in Table 2. Each of the eleven tables is made for the largest supported power of 2. The lines without line numbers are factors not supported in LTE (because there is no factor of 12) or WiMAX and therefore are not supported on this embodiment of FFT unit. LTE frequency shift is only supported for factors of 8192 and 6144. Of course, in other embodiments different sizes may be supported by loading the tables accordingly.

TABLE 2

Table of eleven prime DFT sizes stored as twiddle factor tables.

|    |      | power of 5 | power of 3 | power of 2 |
|----|------|------------|------------|------------|
| 1  | 8192 | 0          | 0          | 13         |
| 2  | 6144 | 0          | 1          | 11         |
| 3  | 1152 | 0          | 2          | 7          |
| 4  | 864  | 0          | 3          | 5          |
| 5  | 1296 | 0          | 4          | 4          |
| 6  | 1944 | 0          | 5          | 3          |
|    | 1280 | 1          | 0          | 8          |
| 7  | 960  | 1          | 1          | 6          |
| 8  | 720  | 1          | 2          | 4          |
| 9  | 1080 | 1          | 3          | 3          |
|    | 810  | 1          | 4          | 1          |
|    | 1215 | 1          | 5          | 0          |
|    | 800  | 2          | 0          | 5          |
| 10 | 1200 | 2          | 1          | 4          |
| 11 | 1800 | 2          | 2          | 3          |
|    | 1350 | 2          | 3          | 1          |
|    | 2025 | 2          | 4          | 0          |
|    | 6075 | 2          | 5          | 0          |

As the FFT algorithm progresses the tables are changed depending on the size of the DFT at the present stage. Any one table is used only for the size DFT to which it corresponds divided by $2^a$. This way, the memory bank is completely determined by the value of n in the twiddle factor; it is the modulo-2 sum of the binary digits in n.

For example, referring again to the 96-point DFT ($2^5 \times 3$), the table for the first stage is the 6144-point table and a=64. After the first radix-4 stage, the radix-3 stages for DFTs of size 24 are calculated again with the 6144 table with a=256. Then the radix-2 stage for a size 8-DFT are calculated using the 8192 table with a=1024.

The memory banks are assigned so that for any one multiplier, $W_N^{an}$ and $W_N^{a(n+1)}$ are always in different banks. In addition because only ⅛ of the values are stored, depending on the value of the twiddle factor, it is sometimes the value N/4−a(n) and not a(n) that is read from the twiddle factor tables. Therefore, the twiddle banks are calculated as twiddle bank 0=sum(radix-2 digits (bits) of $n$)mod 2 twiddle bank 1=sum(radix-2 digits (bits) of 2048−$n$) mod 2 twiddle bank=2*twiddle bank 0+twiddle bank 1 where n is the index of the table of size N from 0 to N/8. Each entry in the table contains the 15-bit representation of cos (2πn/N) and sin (2πn/N).

The address into each bank is selected so that all values have a unique address. Although there are many possibilities, this embodiment of the FFT unit uses $$addr = \begin{cases} \lfloor (n+2) \cdot \frac{3}{8} \rfloor & \text{for twiddle banks 0 or 3} \\ \lfloor (n+1) \cdot \frac{3}{16} \rfloor & \text{for twiddle banks 1 or 2} \end{cases}$$

where $\lfloor \cdot \rfloor$ means floor or greatest integer less than. This selection is easy to implement in hardware, guarantees unique bank numbers and addresses for all values, and is close to the minimum possible size of N/8.

This means that the bank size for twiddle banks 0 and 3 are $$\lfloor (N/8+2) \cdot \frac{3}{8} \rfloor + 1$$

and for banks 1 and 2

$$\lfloor (N/8+1) \cdot \frac{3}{16} \rfloor + 1.$$

For an N=8192 table for example, the table size is then 385*2+193*2=1156 which is slightly larger than the N/8=1024 that would have been needed to store an 8192 twiddle table with no banks.

Figure 15:
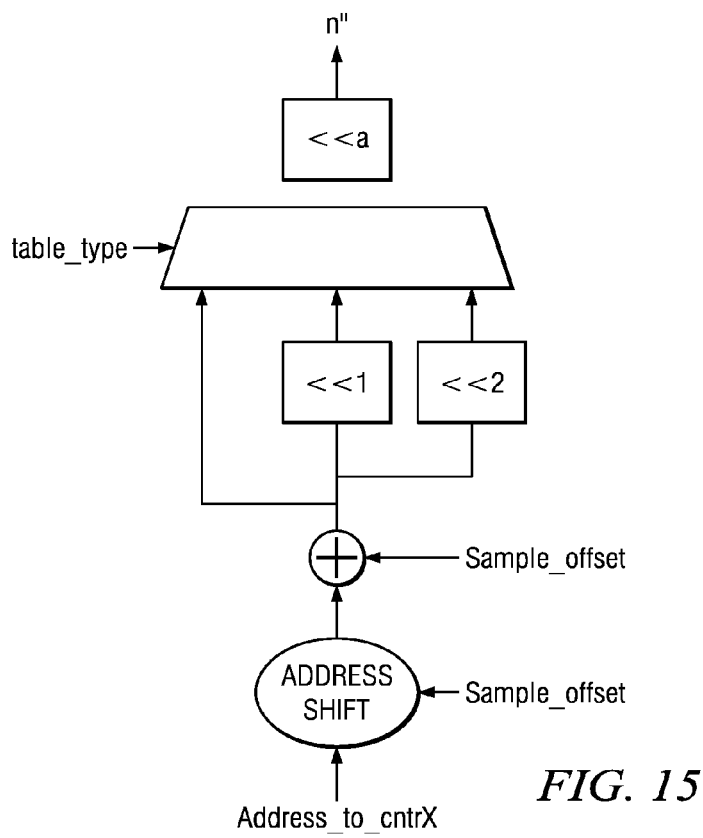
FIG. 15 is an exemplary schematic for twiddle factor address calculation.

FIG. 15 is an exemplary schematic for twiddle factor address calculation. Every calculation cycle, the index of one sample needs to be calculated. According to this index, the bank number and the address within the bank can be calculated. At each computation cycle two indices are calculated, based on the BF bank address calculation as illustrated in FIG. 15. Sample_offset can be 0, 1, 2, or 3 and depends on the relative place of the sample in the memory. Two samples are read from each bank. When reading from banks 0-4 the two samples will have a sample offset of 0 and 1 (0 for the sample placed in the LSBs of the memory). When reading from banks 5-9 the two samples will have a sample offset of 2 and 3.

Figure 16:
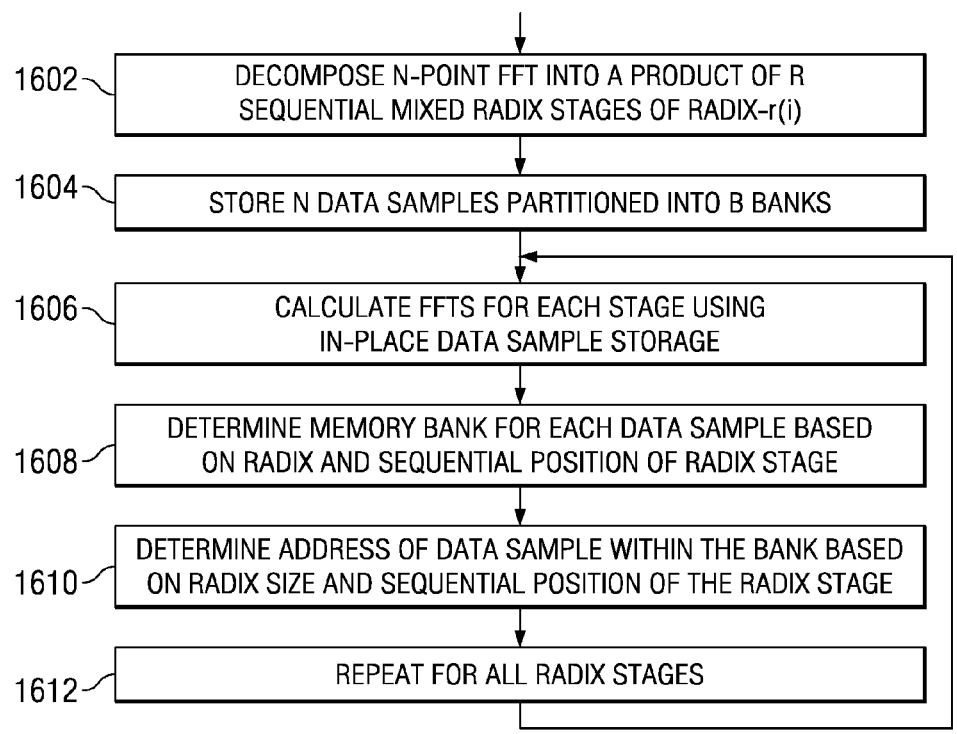
FIG. 16 is a flow diagram illustrating operation of the exemplary FFT unit.

FIG. 16 is a flow diagram illustrating operation of the exemplary FFT unit. As described in more detail above FFT unit 600 FFTC unit 1804 are examples of an FFT processor the supports calculating an N-point Fast Fourier Transform (FFT) using mixed radix stages with in-place data sample storage.

The size N of the desired FFT is decomposed 1602 into a product of R sequential mixed radix stages of radix-r(i), where i represents the stage number, such that N=r(0)* r(1)* r(2)* r(3)* . . . * r(R−1)

wherein the sequential order of the stages determines the order in which they are calculated. Typically, the last radix stage, r(R−1), is constant for all supported FFT sizes, N. In some embodiments, the last stage is always a radix-4 stage. Typically, the number B of memory banks is equal to the first radix stage, r(0).

The N data samples are partitioned into B memory banks of the in-place data sample storage, where r(i) of the memory banks are configured to be read or written concurrently, where B is equal to a largest radix of the R radix stages. Typically, the number of memory banks B is equal to the largest radix stage, or to a multiple of the largest radix size.

For each radix stage at least one radix-r(i) butterfly is calculated 1606 in each of a sequence of time units, wherein for all butterfly calculations in R−1 radix stages, each input data sample to each radix-r(i) butterfly comes from r(i) different memory banks and the output data samples are written to the same memory locations in the r(i) memory banks as the input data samples. In this embodiment, the input data samples for the last butterfly are all taken from the same memory bank.

The memory banks are determined 1608 from which the input data samples and output data samples of the butterflies for each sequential radix stage are stored based on the radix size and sequential position of the radix stage.

The address of the input data samples and the output data samples within each memory bank are determined 1610 based on the radix size and sequential position of the radix stage. This may be done by maintaining a counter with base-r(i) digits and using the counter to determine the radix size and sequential position of the radix stage. In some embodiments, the address used for each memory bank is found by converting the counter digits into a decimal value and taking that value modulo the size of the memory banks.

In some embodiments, the counter digit corresponding to the current radix stage does not count, but instead all of its valid values are used to form a different address for each memory bank.

In some embodiments, converting the counter digit comprises decomposing the conversion of each digit into multiple stages where each stage is a programmable multiply by the radix of one of the previous digits repeatedly used to perform a full multiply operation. Taking the value modulo the bank size operation may be performed after each programmable multiply.

These operations are then repeated 1612 for all the radix stages in the sequence.

System Example

Figure 17:
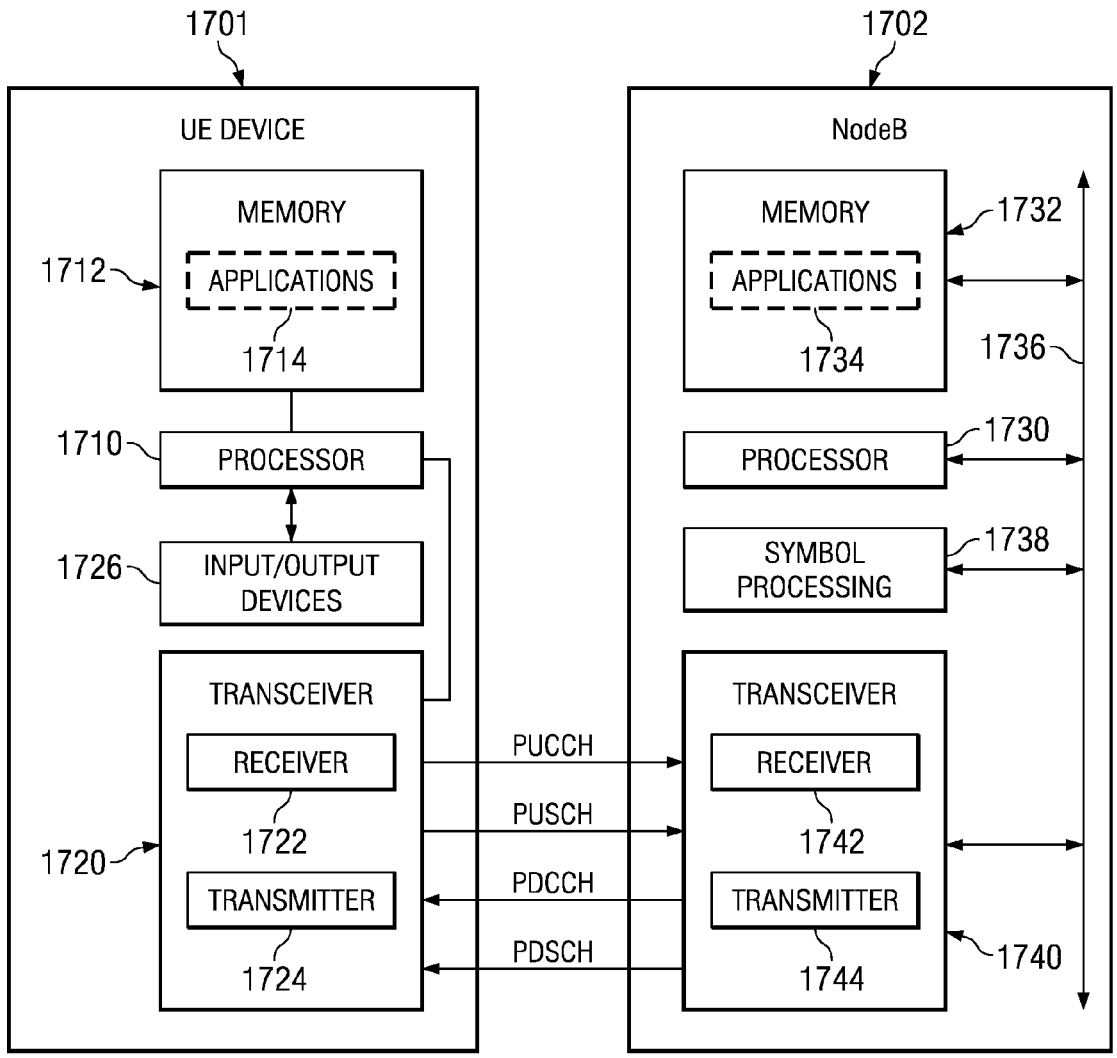
FIG. 17 is block diagram of a base station and a mobile handset used in the network of FIG. 1.

FIG. 17 is a block diagram illustrating operation of a NodeB 1702 and a mobile UE 1701 in the network system of FIG. 1. The mobile UE device 1701 may represent any of a variety of devices such as a server, a desktop computer, a laptop computer, a cellular phone, a Personal Digital Assistant (PDA), a smart phone or other electronic devices. In some embodiments, the electronic mobile UE device 1701 communicates with the NodeB 1702 based on a LTE or E-UTRAN protocol. Alternatively, another communication protocol now known or later developed can be used.

As shown, the mobile UE device 1701 comprises a processor 1710 coupled to a memory 1712 and a Transceiver 1720. The memory 1712 stores (software) applications 1714 for execution by the processor 1710. The applications could comprise any known or future application useful for individuals or organizations. As an example, such applications could be categorized as operating systems (OS), device drivers, databases, multimedia tools, presentation tools, Internet browsers, e-mailers, Voice-Over-Internet Protocol (VOIP) tools, file browsers, firewalls, instant messaging, finance tools, games, word processors or other categories. Regardless of the exact nature of the applications, at least some of the applications may direct the mobile UE device 1701 to transmit UL signals to the NodeB (base-station) 1702 periodically or continuously via the transceiver 1720. In at least some embodiments, the mobile UE device 1701 identifies a Quality of Service (QoS) requirement when requesting an uplink resource from the NodeB 1702. In some cases, the QoS requirement may be implicitly derived by the NodeB 1702 from the type of traffic supported by the mobile UE device 1701. As an example, VOIP and gaming applications often involve low-latency uplink (UL) transmissions while High Throughput (HTP)/Hypertext Transmission Protocol (HTTP) traffic can involve high-latency uplink transmissions.

Transceiver 1720 includes uplink logic which may be implemented by execution of instructions that control the operation of the transceiver. Some of these instructions may be stored in memory 1712 and executed when needed by processor 1710. As would be understood by one of skill in the art, the components of the Uplink Logic may involve the physical (PHY) layer and/or the Media Access Control (MAC) layer of the transceiver 1720. Transceiver 1720 includes one or more receivers 1722 and one or more transmitters 1724.

Processor 1710 may send or receive data to various input/output devices 1726. A subscriber identity module (SIM) card stores and retrieves information used for making calls via the cellular system. A Bluetooth baseband unit may be provided for wireless connection to a microphone and headset for sending and receiving voice data. Processor 1710 may send information to a display unit for interaction with a user of the mobile UE during a call process. The display may also display pictures received from the network, from a local camera, or from other sources such as a USB connector. Processor 1710 may also send a video stream to the display that is received from various sources such as the cellular network via RF transceiver 1722 or the camera.

During transmission and reception of voice data or other application data, transmitter 1724 sends control data and user data to NodeB 1702. It also receives control information and user data from NodeB 1702 DFT processing to encode and to decode the control and user information may be performed using an embodiment of the FFT unit descried in more detail above. In one embodiment, the FFT unit is controlled by executing instructions stored in memory 1712 by processor 1710. In other embodiments, the FFT unit may be controlled by a separate processor/memory unit, by a hardwired state machine, or by other types of control logic, for example.

NodeB 1702 comprises a Processor 1730 coupled to a memory 1732, symbol processing circuitry 1738, and a transceiver 1740 via backplane bus 1736. The memory stores applications 1734 for execution by processor 1730. The applications could comprise any known or future application useful for managing wireless communications. At least some of the applications 1734 may direct the base-station to manage transmissions to or from the user device 1701.

Transceiver 1740 comprises an uplink Resource Manager, which enables the NodeB 1702 to selectively allocate uplink PUSCH resources to the user device 1701. As would be understood by one of skill in the art, the components of the uplink resource manager may involve the physical (PHY) layer and/or the Media Access Control (MAC) layer of the transceiver 1740. Transceiver 1740 includes a Receiver(s) 1742 for receiving transmissions from various UE within range of the NodeB and transmitter(s) 1744 for transmitting data and control information to the various UE within range of the NodeB.

The uplink resource manager executes instructions that control the operation of transceiver 1740. Some of these instructions may be located in memory 1732 and executed when needed on processor 1730. The resource manager controls the transmission resources allocated to each UE that is being served by NodeB 1702 and broadcasts control information via the physical downlink control channel PDCCH.

Symbol processing circuitry 1738 performs demodulation. The EUTRA defines SC-FDMA (via DFT-spread OFDMA) as the uplink modulation. The basic SC-FDMA DSP radio can include discrete Fourier transform (DFT), resource (i.e. tone) mapping, and IFFT (fast implementation of IDFT) to form a data stream for transmission. To decode the data stream from the received signal, the SC-FDMA radio can include DFT, resource de-mapping and IFFT. The operations of DFT, IFFT and resource mapping/de-mapping may be performed by an FFT unit as described in more detail above. The FFT unit may be controlled by instructions stored in memory 1012 and executed by DBB 1002 in response to signals received by transceiver 1006, for example.

OTHER EMBODIMENTS

While the invention has been described with reference to illustrative embodiments, this description is not intended to be construed in a limiting sense. Various other embodiments of the invention will be apparent to persons skilled in the art upon reference to this description. This invention applies in uplink and downlink. Various embodiments of this invention apply for many modulation strategies, which include but are not limited to, OFDMA, CDMA, DFT-spread FDMA, SC-OFDMA, and others. Embodiments of this invention can be applied in most if not all emerging wireless standards, including EUTRA.

While various embodiments of particular sets of mixed radix stages are described herein, embodiments of the invention are not limited to the radix sizes, bank sizes, and data precisions described herein.

Although the invention finds particular application to systems using Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

An embodiment of the invention may include a system with a processor coupled to a computer readable medium in which a software program is stored that contains instructions that when executed by the processor perform the functions of modules and circuits described herein. The computer readable medium may be memory storage such as dynamic random access memory (DRAM), static RAM (SRAM), read only memory (ROM), Programmable ROM (PROM), erasable PROM (EPROM) or other similar types of memory. The computer readable media may also be in the form of magnetic, optical, semiconductor or other types of discs or other portable memory devices that can be used to distribute the software for downloading to a system for execution by a processor. The computer readable media may also be in the form of magnetic, optical, semiconductor or other types of disc unit coupled to a system that can store the software for downloading or for direct execution by a processor.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

It is therefore contemplated that the appended claims will cover any such modifications of the embodiments as fall within the true scope and spirit of the invention.

What is claimed is:

1. A method for calculating an N-point Fast Fourier Transform (FFT) using mixed radix stages with in-place data sample storage, comprising:

decomposing N into a product of R sequential mixed radix stages of radix-r(i), where i represents the stage number, such that $$N=r(0)* r(1)* r(2)* r(3)* \ldots * r(R-1)$$

wherein the sequential order of the stages determines the order in which they are calculated;

storing N data samples partitioned into at least B memory banks of the in-place data sample storage, where r(i) of the memory banks are configured to be read or written concurrently, where B is equal to a largest radix of the R radix stages;

calculating for each radix stage at least one radix-r(i) butterfly in each of a sequence of time units, wherein for at least some butterfly calculations, each input data sample to each radix-r(i) butterfly comes from r(i) different memory banks and the output data samples are written to the same memory locations in the r(i) memory banks as the input data samples;

determining from which memory bank the input data samples and output data samples of the butterflies for each sequential radix stage are stored based on the radix size and sequential position of the radix stage, and determining the address of the input data samples and the output data samples within each memory bank based on the radix size and sequential position of the radix stage.

2. The method of claim 1, wherein determining the address of the input data samples comprises:

maintaining a counter with base-r(i) digits; and using the counter to determine the radix size and sequential position of the radix stage.

3. The method of claim 1, where at least two of the radix stages are of different radix size.

4. The method of claim 1 wherein more than one data sample is read or written at a time from each memory bank, whereby more than one radix-r(i) butterfly is calculated in each time unit.

5. The method of claim 1, wherein the last radix stage, r(R−1), is always a radix-4 stage.

6. The method of claim 1, wherein the last radix stage, r(R−1), is constant for all supported FFT sizes, N.

7. The method of claim 1, wherein the number B of memory banks is equal to the first radix stage, r(0).

8. The method of claim 1, wherein the number of memory banks B is equal to the largest radix stage.

9. The method of claim 1, wherein the memory bank number used for each butterfly input data sample is equal to the sum of the counter digits modulo the number of memory banks.

10. The method of claim 2, wherein the address used for each memory bank is found by converting the counter digits into a decimal value and taking that value modulo the size of the memory banks.

11. The method of claim 2, wherein the counter digit corresponding to the current radix stage does not count, but instead all of its valid values are used to form a different address for each memory bank.

12. The method of claim 10, wherein converting the counter digit comprises decomposing the conversion of each digit into multiple stages where each stage is a programmable multiply by the radix of one of the previous digits repeatedly used to perform a full multiply operation.

13. The method of claim 12, wherein taking the value modulo the bank size operation is performed after each programmable multiply.

14. The method of claim 10 further comprising resetting the value of the counter is calculated from a desired decimal value, where N is the product of a power of two and three.

15. The method of claim 1, wherein the number of banks read at each stage is determined by the butterfly radix size even when the number of banks is greater than the butterfly radix size.

16. A system comprising a Fast Fourier Transform (FFT) unit for calculating an N-point FFT using mixed radix stages with in-place data sample storage, wherein the FFT unit comprises:

an in-place data sample storage memory partitioned into at least B memory banks, configured to receive N data samples, wherein each memory bank is configured to be read from or written to simultaneously;

bank selection and reorder circuitry coupled to the B memory banks configured to simultaneously retrieve r(i) sets of data samples from r(i) different memory banks;

butterfly computation logic coupled to receive the r(i) sets of data samples, the butterfly computation logic selectively configured to perform at least one butterfly of radix-r(i) for each radix stage in each of an indexed sequence of time units, wherein the N-point FFT is decomposed into a product of R sequential mixed radix stages r(i), where i represents the stage number, such that $N = r(0) * r(1) * r(2) * r(3) * \ldots * r(R-1)$ wherein the sequential order of the stages determines the order in which they are calculated, and where B is equal to a largest radix of the R radix stages, wherein for at least some1 butterfly calculations, each input data sample to each radix-r(i) butterfly comes from r(i) different banks and the output data samples are written to the same memory locations in the r(i) memory banks as the input data samples;

counter logic having base-r(i) digits, the counter logic configured to determine the radix size and sequential position of the radix stage; and address selection logic coupled between the counter logic and the in-place data sample storage memory, the address selection logic configured to determine from which memory bank the input data samples and output data samples of the butterflies for each sequential radix stage are stored based on the radix size and sequential position of the radix stage, and to determine the address of the input data samples and the output data samples within each memory bank based on the radix size and sequential position of the radix stage.

17. The system of claim 16, wherein more than one data sample is read or written at a time from each memory bank, whereby more than one radix-r(i) butterfly is calculated in each time unit.

18. The system of claim 16, wherein the counter logic is configured to determine the address used for each memory bank by converting the counter logic digits into a decimal value and taking that value modulo the size of the memory banks, wherein the counter logic comprises multiple stages for converting the counter digit, where each stage is a programmable multiply by the radix of one of the previous digits repeatedly used to perform a full multiply operation.

19. The system of claim 16, wherein the counter logic comprises a radix stage lookup table configured to indicate a different sequence of radix stages for each of a plurality of different values of N.

20. The system of claim 16, wherein the bank selection logic is configured to determine the number of banks read at each stage by using the butterfly radix size even when the number of banks is greater than the butterfly radix size.

21. The system of claim 16 being a base station, further comprising:

a radio frequency (RF) receiver coupled to an antenna for receiving a plurality of radio signals from a plurality of mobile hand sets, an output of RF receiver logic being coupled to provide the N data samples; and a control processor controllably coupled to the FFT unit and configured to receive an output of the FFT unit and to thereby demodulate a data stream embedded in each of the plurality of radio signals.

* * * * *